(12) United States Patent
Brady, Jr. et al.

(10) Patent No.: US 7,487,938 B2
(45) Date of Patent: Feb. 10, 2009

(54) SYSTEM AND METHOD UTILIZING INTERNET PROTOCOL (IP) SEQUENCING TO IDENTIFY COMPONENTS OF A PASSENGER FLIGHT INFORMATION SYSTEM (PFIS)

(75) Inventors: Kenneth A. Brady, Jr., Trabuco Canyon, CA (US); Jason Kyong-min Yi, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 649 days.

(21) Appl. No.: 11/058,037

(22) Filed: Feb. 15, 2005

(65) Prior Publication Data

US 2005/0273823 A1    Dec. 8, 2005

Related U.S. Application Data

(60) Provisional application No. 60/545,061, filed on Feb. 17, 2004, provisional application No. 60/545,062, filed on Feb. 17, 2004.

(51) Int. Cl.
*B64D 11/00* (2006.01)

(52) U.S. Cl. .................... 244/118.5; 701/3; 701/36; 709/218

(58) Field of Classification Search ............ 244/118.5, 244/129.1; 701/3, 36; 709/224, 218, 219
See application file for complete search history.

(56) References Cited

U.S. PATENT DOCUMENTS

| | | | | |
|---|---|---|---|---|
| 5,555,466 | A | * | 9/1996 | Scribner et al. ............... 725/75 |
| 5,778,203 | A | * | 7/1998 | Birkedahl et al. ........... 710/306 |
| 5,854,591 | A | * | 12/1998 | Atkinson ..................... 725/76 |
| 5,973,722 | A | * | 10/1999 | Wakai et al. .................. 725/76 |
| 6,131,119 | A | * | 10/2000 | Fukui ......................... 709/224 |
| 6,757,712 | B1 | * | 6/2004 | Bastian et al. ............. 709/206 |
| 6,813,777 | B1 | | 11/2004 | Weinberger et al. |
| 6,824,104 | B2 | * | 11/2004 | Smallhorn .............. 244/118.5 |
| 6,835,068 | B2 | * | 12/2004 | Pappas et al. ................. 439/34 |
| 7,130,724 | B2 | * | 10/2006 | Petersen et al. ................ 701/3 |
| 2002/0059614 | A1 | | 5/2002 | Lipsanen et al. |
| 2003/0193921 | A1 | | 10/2003 | Kim |

* cited by examiner

*Primary Examiner*—J. Woodrow Eldred
(74) *Attorney, Agent, or Firm*—Drinkle Biddle & Reath LLP

(57) ABSTRACT

A system and method utilizing Internet Protocol (IP) sequencing to identify components of a passenger flight information system (PFIS). More particularly, the present invention relates to a system and method which assigns an IP address to each line replaceable unit (LRU), such as a seat electronics box (SEB) or other seat components of a PFIS, so that the components can be readily identified by the PFIS when communication is to occur between the components and, for example, a head end unit of the PFIS. Once the IP sequencing process has been performed, the PFIS can be used to provide services to the passengers, such as audio and video entertainment. Such entertainment can be set in accordance with an auto-scripting process in which the flight crew can select the theme for the flight.

20 Claims, 34 Drawing Sheets

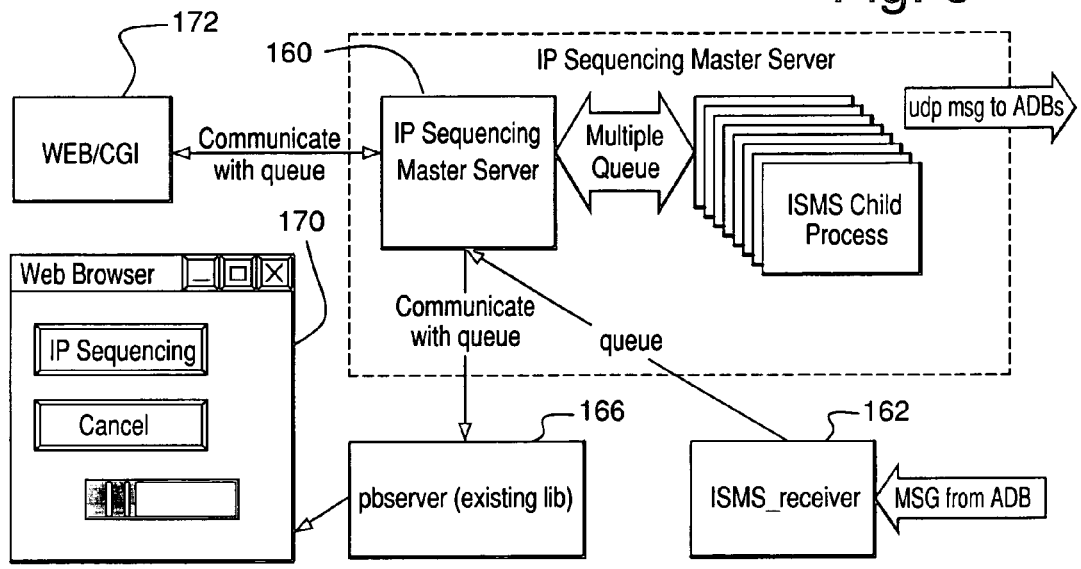
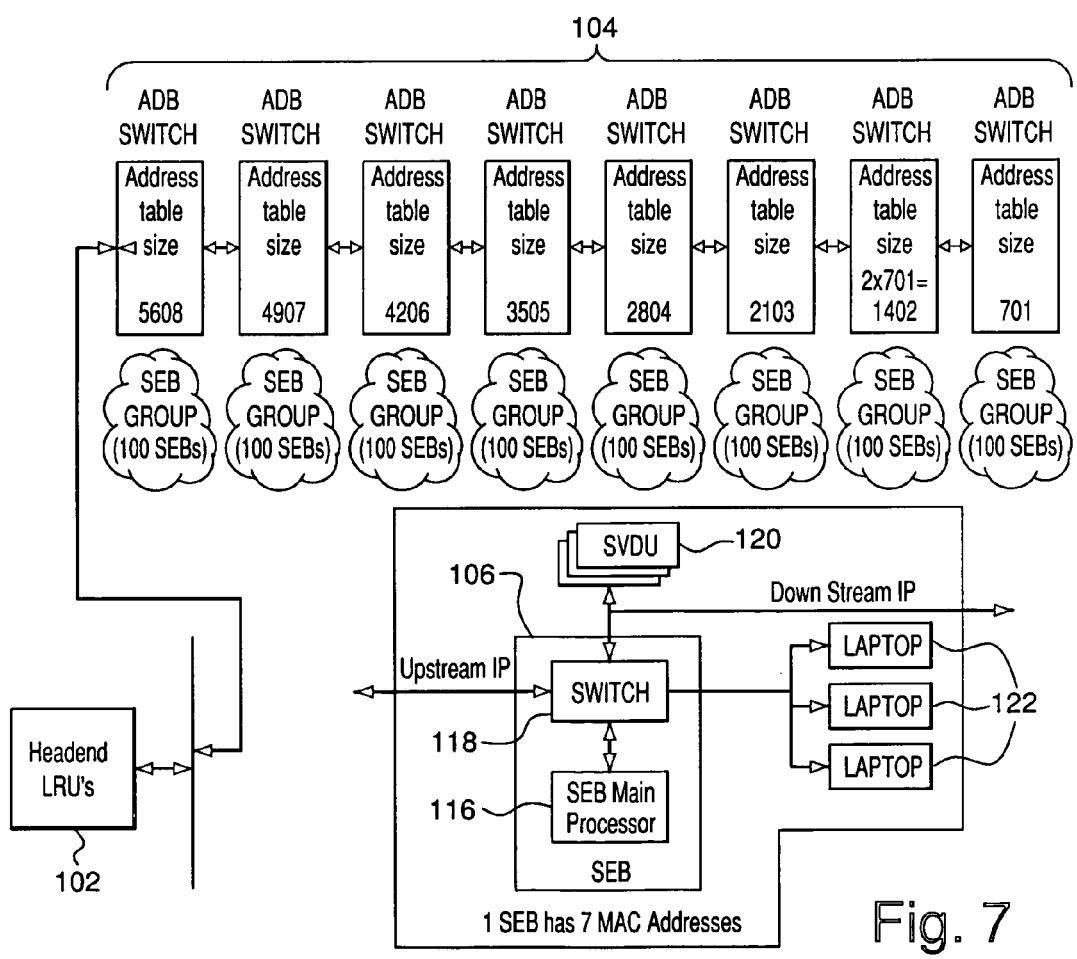

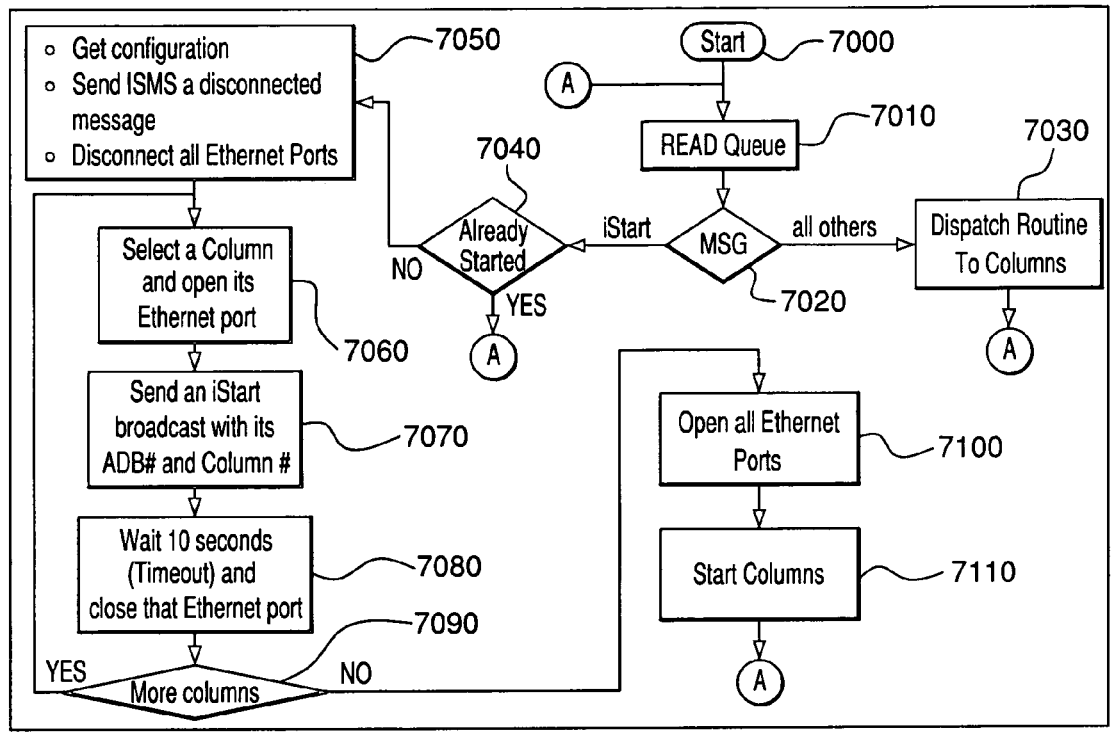
Fig. 16   ADB SEQUENCE MANAGER FLOW DIAGRAM
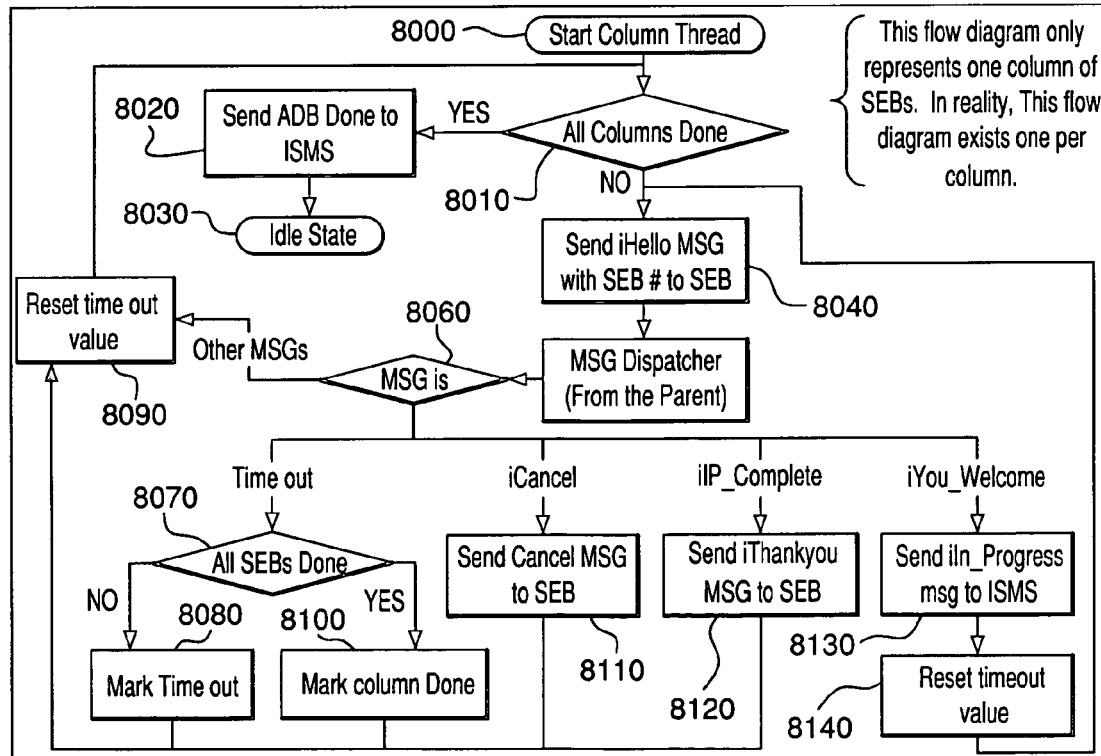
Fig. 17   SEAT COLUMN FLOW DIAGRAM

SYSTEM AND METHOD UTILIZING INTERNET PROTOCOL (IP) SEQUENCING TO IDENTIFY COMPONENTS OF A PASSENGER FLIGHT INFORMATION SYSTEM (PFIS)

CROSS-REFERENCE TO RELATED PATENT APPLICATIONS

This application claims benefit under 35 U.S.C. § 119(e) from U.S. Provisional Patent Application No. 60/545,061, filed Feb. 17, 2004, and from U.S. Provisional Patent Application No. 60/545,062, filed Feb. 17, 2004, the entire content of each being incorporated herein by reference.

BACKGROUND OF THE INVENTION

1. Field of the Invention

The present invention relates to a system and method utilizing Internet Protocol (IP) sequencing to identify components of a passenger flight information system (PFIS). More particularly, the present invention relates to a system and method which assigns an IP address to each line replaceable unit (LRU), such as a seat electronics box (SEB) or other seat components of a PFIS, so that the components can be readily identified by the PFIS when communication is to occur between the components and, for example, a head end unit of the PFIS.

2. Description of the Related Art

Many commercial vehicles today, in particular, aircraft, include in-flight entertainment systems (IFES) or passenger flight information systems (PFIS) with which the passengers can interact via control device, such as control buttons on the armrests of the seats or other plug-in devices. More sophisticated PFIS are being developed and employed on aircraft to further enhance the passengers' flight experience.

As shown in FIG. 1, a typical PFIS system 100 includes a plurality of computers or other types of processing devices, which are connected to provide various functions. These computers are arranged, for example, audio/video head-end equipment 102, area distribution boxes 104, and seat electronic boxes (SEB) 106. The head-end equipment 102 can include, for example, an audio-video controller (AVC) 108 and a cabin management terminal (CMT) 110. As can be appreciated by one skilled in the art, the AVC 108 provides audio and video, such as music, movies and other entertainment, to the headphones and video display units associated with the passenger seats. The CMT 110 can be used by, for example, a flight attendant or maintenance personnel, to control the PFIS 100 to provide the various functions, such as making an announcement, showing a movie, configuring the system and so on.

In the modular environment of an aircraft, each of the SEBs 106, in particular, are generally referred to as a line replaceable unit (LRU) since these units are deployed in the system but can be individually removed or replaced generally without impacting the overall system performance. As indicated, the SEBs 106 are connected directly to passenger seats or seat groups (not shown) that are identified by their respective row and seat numbers, and provide the interfaces between passengers on an aircraft and the other components of the PFIS 100, such as the head-end equipment 102. For example, as shown in FIG. 1, the SEB identified as SEB 106-1 is connected to the seats 3A and 3C, while SEB 106-2 is connected to seats 2A and 2C, and SEB 106-3 is connected to seats 1A and 1C, and so on. The SEBs 106 thus enable the passengers to have access to a plurality of functions and features provided by the PFIS 100, such as the access to audio and/or visual information, seat control functions, flight attendant access and, in more advanced systems, telephony and computer operations, Internet access and so on. For example, an SEB 106-1 associated with seat group 3A and 3C can receive channel and volume control signals entered by a passenger sitting in either seat 3A or 3C via control equipment, such as buttons on the armrest of the seat or via a tethered controller, and provide the necessary controls to the audiovisual equipment associated with the passenger seat to provide the desired channel level and volume of the audio to the passenger.

As can be appreciated by one skilled in the art, in order for the equipment of the PFIS 100 to be able to properly respond to requests made by a passenger, the PFIS must have some technique for identifying the location of the passenger making the request. Since each SEB 106 is associated with one or more seats or seat groups, this location typically can be determined by identifying the SEB 106 via which the passenger request was made. Once the response is provided to the appropriate SEB 106, the computing equipment in the SEB 106 can determine from which seat the request was made, for example, by identifying the port in the SEB 106 via which the request was received. The SEB 106 can thus deliver the appropriate response, such as an audio or audio/visual signal, to the audio/video equipment that is connected to the SEB 106 and associated with that particular passenger seat.

In these types of systems, the SEBs 106 and the other equipment of the PFIS 100, such as the head-end equipment 102 and ADBs 104, must be capable of readily communicating with each other. More importantly, the SEBs 106 must be able to provide requests to the head-end equipment 102, and the head-end equipment 102 must be capable of recognizing from which SEBs 106 the requests were received, so that the head-end equipment can provide the appropriate responses to the appropriate SEBs 106.

Accordingly, a need exists for a PFIS 100 having SEBs 106 and other LRUs that can communicate and operate reliably in the system.

SUMMARY OF THE INVENTION

The embodiments of the present invention described herein provide a system and method utilizing Internet Protocol (IP) sequencing to identify components of a passenger flight information system (PFIS). More particularly, the present invention relates to a system and method which assigns an IP address to each line replaceable unit (LRU), such as a seat electronics box (SEB) or other seat components of a PFIS, so that the components can be readily identified by the PFIS when communication is to occur between the components and, for example, a head end unit of the PFIS. Once the IP sequencing process has been performed, the PFIS can be used to provide services to the passengers, such as audio and video entertainment. Such entertainment can be set in accordance with an auto-scripting process in which the flight crew can select the theme for the flight.

BRIEF DESCRIPTION OF THE DRAWINGS

The above objects and advantages of the present invention will become more apparent by describing in detail a preferred embodiment thereof with reference to the attached drawings in which:

FIG. 6 is another conceptual diagram of the communication between the web browser, WEB/CGI and IP sequencing master server of the system shown in FIGS. 1 and 2;

FIG. 7 is a conceptual diagram of an example of the relationship between the switches of an ADB and the head-end equipment and SEBs of the system shown in FIGS. 1 and 2;

FIG. 16 is a flowchart showing an example of the operations performed by an ADB sequence manager of the system shown in FIGS. 1 and 2 during an IP sequencing operation according to an embodiment of the present invention;

FIG. 17 is a flowchart showing an example of further operations performed by an ADB and SEB of the system shown in FIGS. 1 and 2 during an IP sequencing operation according to an embodiment of the present invention;

DETAILED DESCRIPTION OF THE PREFERRED EMBODIMENTS

Figure 2:
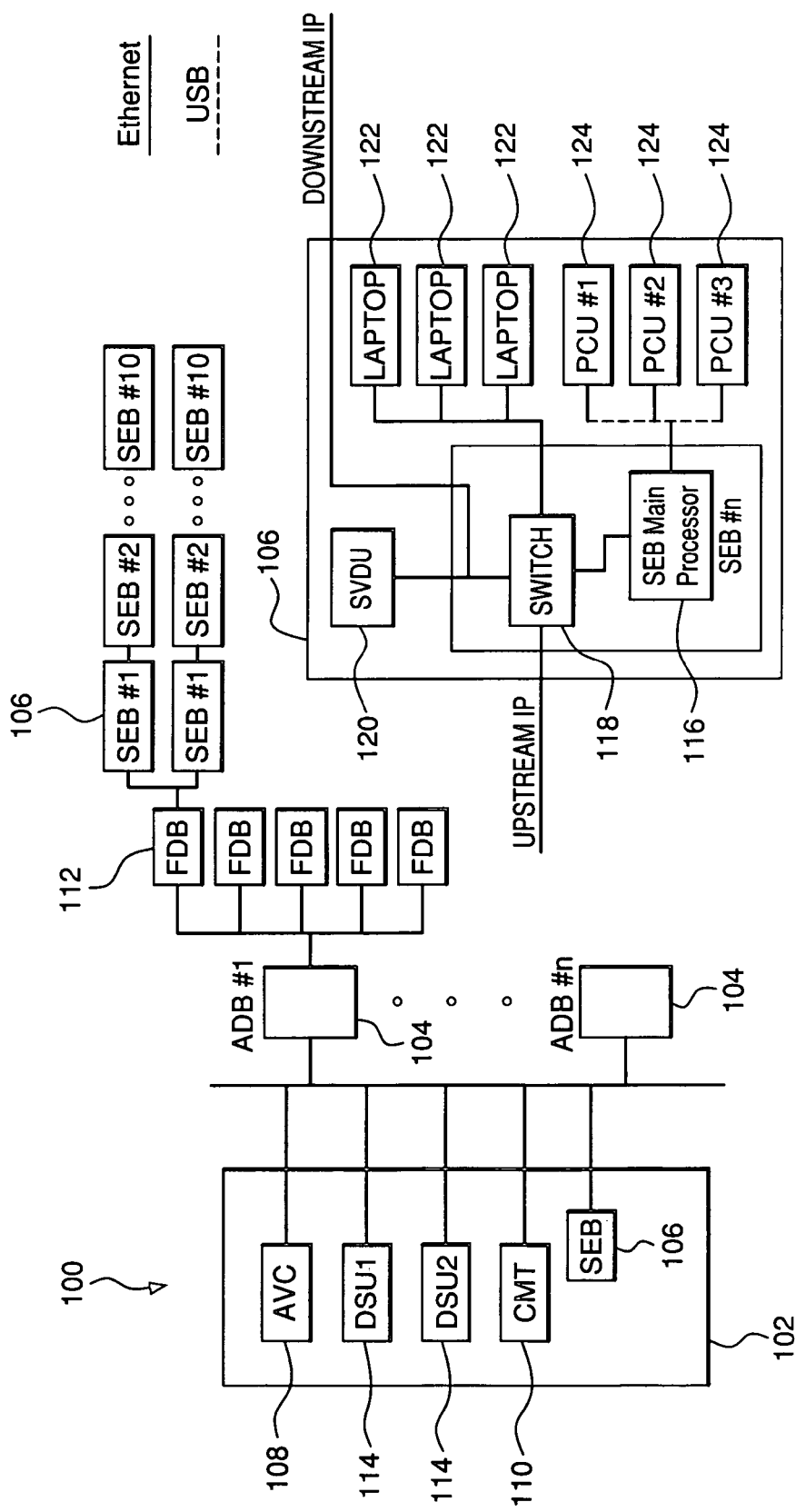
FIG. 2 is a conceptual diagram of a further example of the interconnectivity between the components of the system shown in FIG. 1.

As discussed in the Background section above, a PFIS 100 employing an IP sequencing system and method according to the embodiment of the present invention. Further details of a PFIS 100 are shown in FIG. 2. As indicated, the PFIS 100 includes head-end equipment 102, a plurality of ADBs 104, and a plurality of SEBs 106. The ADBs 104 can each be coupled to a plurality of SEBs 106 via a plurality of floor disconnect boxes (FDBs) 112 and Ethernet connections. The FDBs merely provide connection points between the under floor cabling and the above floor SEBs 106.

As further indicated in FIG. 2, the head-end equipment 102 includes an AVC 108 and a CMT 110. The head-end equipment 102 further includes a plurality of digital server units (DSUs) 114, the features of which are discussed in more detail below, and its own SEB 106. As also shown in FIG. 2, an SEB 106 that is associated with a passenger seat or seat group can include a main processor 116, a switch 118, and a smart video display unit (SVDU) 120, the features of which are discussed in more detail below. An SVDU 120 is considered "smart" because it includes its own processor, for example, and is capable of performing its own tasks and decision making, as opposed to only receiving commands from another device such as an SEB 106. As indicated, the switch 118 can provide connection for a plurality of laptop computers 122 that can be used by passengers in the seats associated with the SEB 106. Furthermore, the SEB main processor 116 can include USB ports that provide access to a plurality of passenger control units (PCUs) 124 which are discussed in more detail below.

As will now be discussed with regard to FIGS. 1 and 2 and the following drawings, the embodiments of the present invention provide a system and method for using IP communications as a mode of communicating information between LRUs in the PFIS 100, in particular, the SEBs 106 and the head-end server equipment 102. In order for the head-end server equipment 102 to be able to recognize from which SEBs 106 a certain requests have been made so that the appropriate information, such as audio and/or video data, can be provided to those SEBs 106, it is required that the PFIS 100 be able to identify each SEB 106 in a unique manner. In order to accomplish this, an the system and method according to the embodiment of the present invention performs an "IP sequencing" process during which a unique IP address is assigned to each respective SEB 106 and other LRUs. The system and method can thus map the locations of the SEBs 106 and other LRUs in the PFIS 100 when they are installed.

It is noted that any SEB 106 can be mounted anywhere in the aircraft, and thus anywhere in the PFIS 100. Hence, it is not practical to assign identification information to the SEBs 106 prior to installing them in the PFIS 100. The system and method thus enables the head-end equipment 102 to create and store a table of IP addresses that are uniquely assigned to each SEB 106 so that those IP addresses are always the same for the respective locations in the aircraft and thus in the PFIS 100. The mapping process needs to be capable of isolating each SEB 106 and identify its relative location from a known reference point. Once and SEB 106 is isolated, the technique uses the IP table of addresses to assign the correct unique IP address to that particular SEB 106 as discussed in more detail below.

Figure 3:
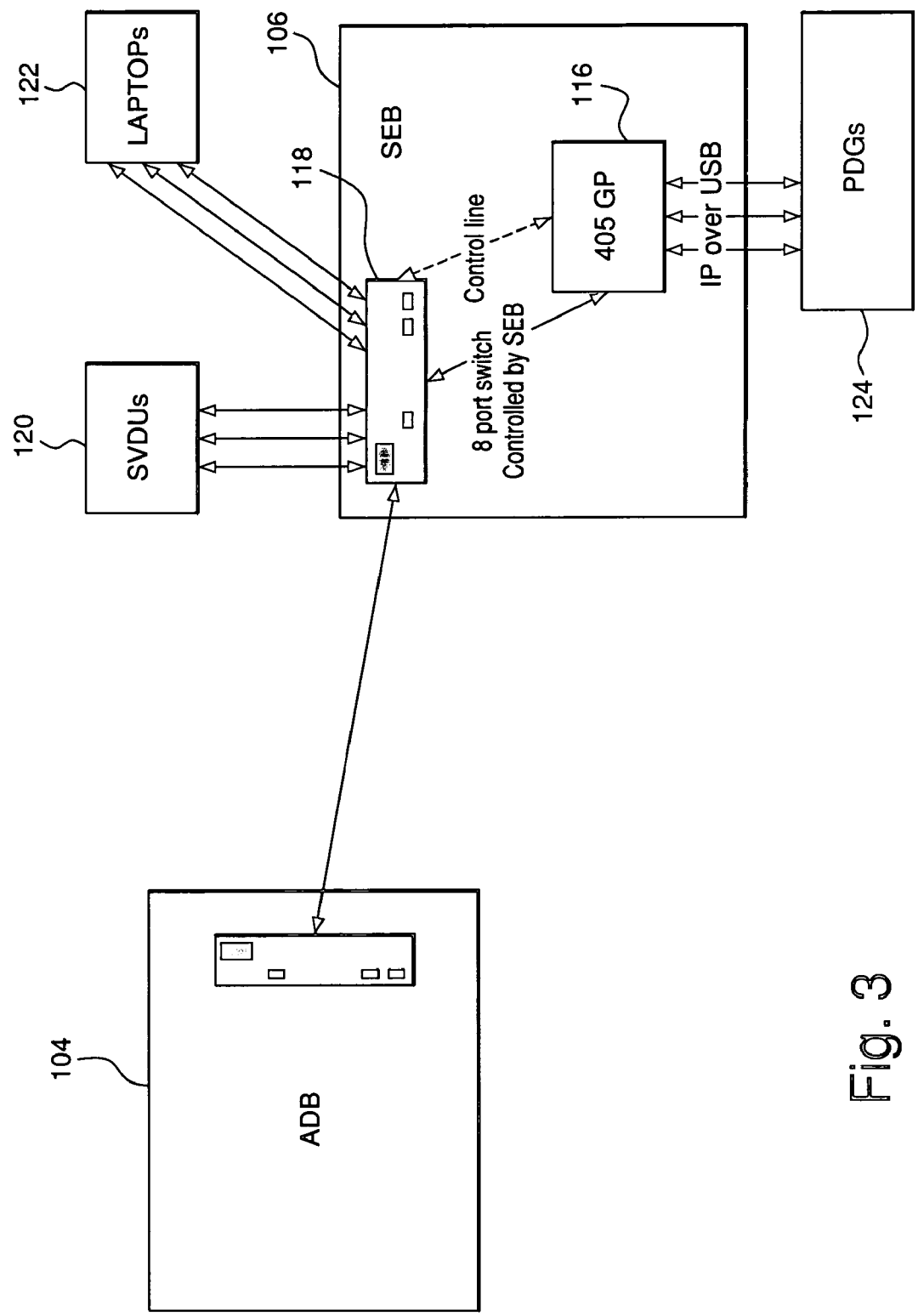
FIG. 3 is a conceptual diagram of an example of the communication between components of the system shown in FIGS. 1 and 2.

In this example, each SEB 106 and each ADB 104 has a built-in 8-port or 16-port Ethernet switch, such as switch 118 as shown in FIGS. 2 and 3. The switch 118 is capable of enabling or disabling each port under control of the processor 116. Each SEB 106 further has an upstream and a downstream port that is used to link the SEB 106 to an SEB 106 or ADB 104 that is upstream in the PFIS 100. Each SEB 106 further includes a downstream link that links itself to the next SEB 106 downstream in the chain. In the example shown in FIG. 2, each ADB 104 has ten switch ports to accommodate 10 columns of SEB groups, and also has an upstream port to communicate with another ADB 104 (not shown) that can be upstream of that ADB 104 with respect to its location relative to the head-end equipment 102, and a downstream port to communicate with a downstream ADB 104. When the IP sequencing process is performed, each ADB 104 will manage assigning the respective IP addresses to the appropriate SEBs 106 in each column that is being serviced by that particular ADB 104. As will be discussed in more detail below, the process involves performing many sequences of UDP broadcast messages to isolate each SEB 106, followed by assigning unique IP addresses to the SEBs.

The IP sequencing functionality in this example can reside in the AVC 108 or DSU 114, as well as in the ADBs 104, SEBs 106 and SVDUs 120, to manage IP and media access control (MAC) address distribution using the Ethernet network, such as a 100 base Ethernet network. Generally, due to unknown IP addresses at the seats and thus, at the SEBs 106 initially, a server (e.g., a server in the AVC 108) in the head-end equipment 102 handling the IP sequencing process will use a broadcast message to commence the IP sequencing process. However, TCP/IP can be used to reply the results from the SEBs 106 and the other LRUs to the servers 114 in the head-end equipment 102. The IP sequencing can be initiated via the CMT 110 by, for example, maintenance crew when the SEBs 106 have been installed or are being serviced. For example, the AVC 108 can host a web page to be accessed by a video terminal (not shown) associated with the CMT 110 to activate the server in the AVC 108. Once the AVC 108 initiates the IP sequencing, the server in the AVC 108 communicates with all ADBs 104 via the specific port numbers to handle the IP sequencing. Each LRU, such as an SEB 106, will include an IP sequencing server to receive a queue from its initiator and an IP sequencer to sequence LRUs for which it will initiate the sequencing process. The IP sequencing will sequence the SEBs 106 and its associated devices in cooperation with the head-end equipment 102 and ADBs 104.

Figure 4:
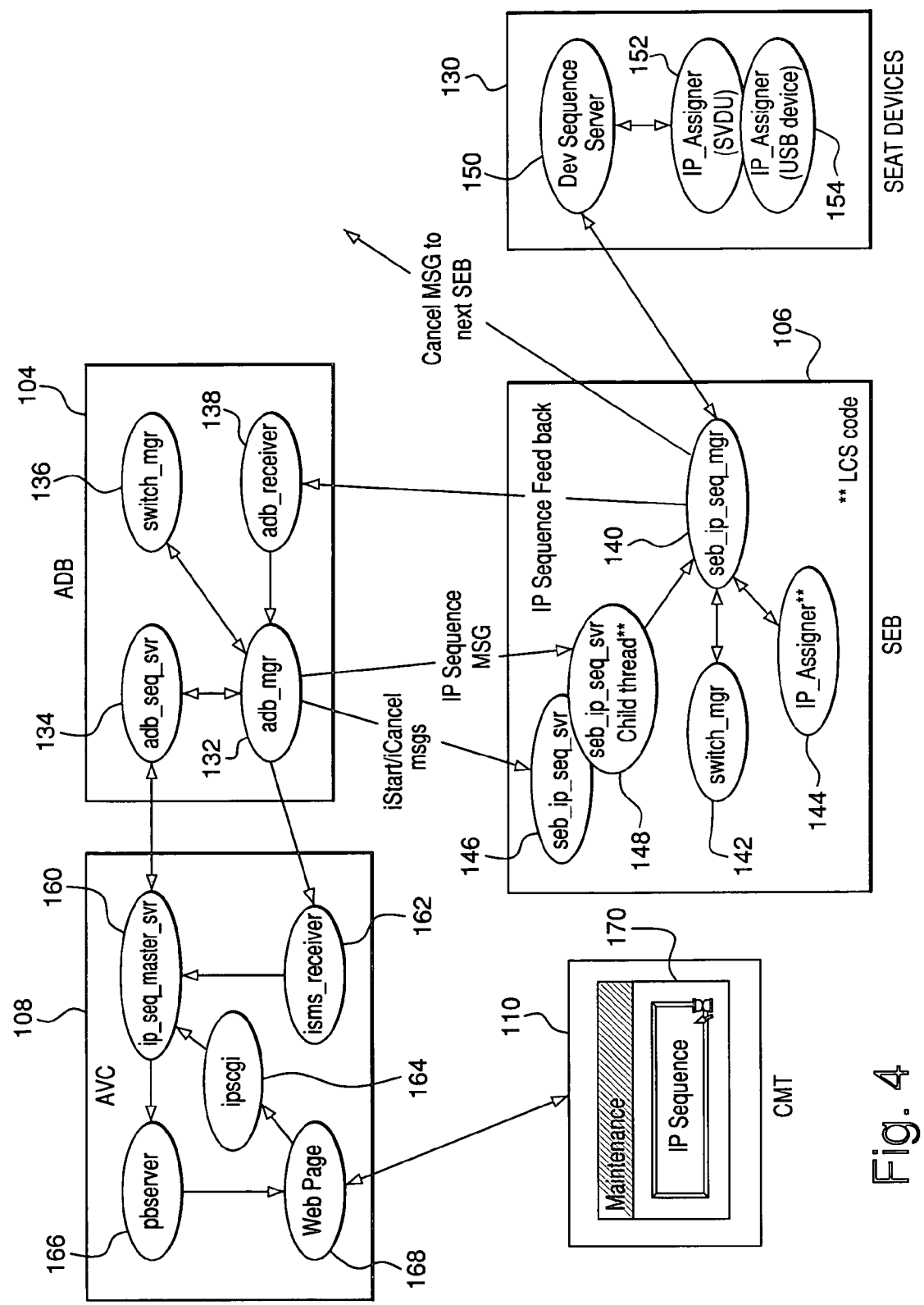
FIG. 4 is an conceptual diagram of an example of the modules employed in the components of the system shown in FIGS. 1 and 2.
Figure 5:
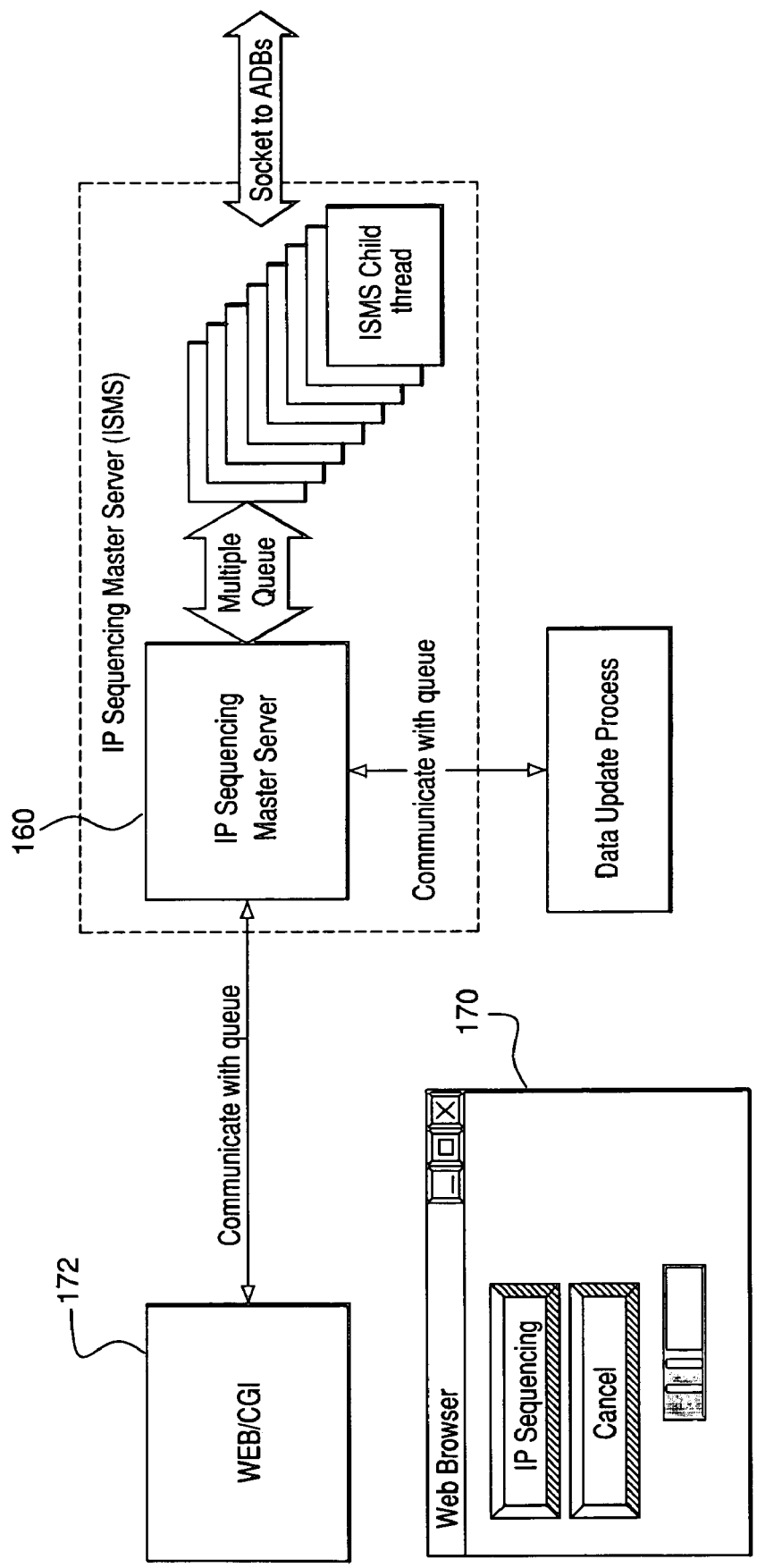
FIG. 5 is a conceptual diagram of the communication between the web browser, WEB/CGI and IP sequencing master server of the system shown in FIGS. 1 and 2.

Further details of the components of the PFIS 100 are shown conceptually in FIGS. 4-6. The diagram of FIG. 4, in particular, illustrates the modules that are present on an ADB 104, an SEB 106, an AVC 108 and CMT 110, as well as on the individual seat devices 130, which can be, for example, SVDUs and PCUs associated with each seat that are connected to a particular SEB 106. As indicated, the ADB 104 includes an ADB manager module 132 that communicates with an ADB sequence server 134, a switch manager module 136 and an ADB receiver module 138. The ADB manager module 132 controls the flow of information from the ADB sequencing server module 134, switch manager module 136 and ADB receiver module 138, and also sends information to the SEB 106 and AVC 108. Each SEB 106 includes an SEB IP sequencing manager module 140, a switch manager module 142, an IP assigning module 144 and multiple SEB IP sequencing server modules 146 and 148. As indicated, the SEB IP sequencing modules 146 and 148 receive IP start and cancel messages from the ADB manager module 132, as well as IP sequence messages from the ADB manager module 132. The SEB IP sequencing manager module 140 provides IP sequence feedback information to the ADB receiver module 138 based on information it receives from the IP assigning module 144 and from the modules of the seat device 130.

As further illustrated, the seat devices 130 include a device sequence server module 150 and IP assigner modules 152 and 154 for the SVDUs and USB devices. The device sequence server module 150 and the SEB IP sequence manager module 140 communicate with each other so that the device sequence server module 150 can provide the IP addresses for the SVDU and the USB devices to the IP assigner modules 152 and 154. The SEB IP sequence manager module 140 further provides feedback information to the ADB receiver 138 of the ADB 104 associated with that SEB 106, and the ADB receiver 138 provides the feedback information to the ADB manager 132. The ADB receiver 138 converts the TCP/IP format message received from the SEB 106 into a queue which the ADB manager module 132 can use. The ADB manager module 132 reads from the queue and does not translate the messages. The manager module 132 handles messages coming from the ISMS and SEB 106 and, in particular, sends Ethernet switch operations down to the low-level process and return back the response as a return code.

As further shown in FIG. 4, the AVC 108 includes IP sequencing master server (ISMS) module 160, ISMS receiver module 162, IPS CGI module 164, PBS server module 166, and web page module 168. The IP sequence master server module 160 provides control information to the ADB sequencing server module 134, which provides that information to the ADB manager module 132 to initiate and cancel the IP sequencing process with the SEBs 106. The IP sequence master server module 160 further receives feedback information from the ISMS receiver module 162 that is provided the ADB manager module 132 of the respective ADBs 104. The IP sequence master server module 160 further communicates with the IPS CGI module 164, PBS server module 166 and webpage module 168 to receive control information from the CMT 110 as provided by the user via the displayed IP sequencing virtual command button 170. Table 1 below provides an indication of the modules and functionality present in the various components of the PFIS 100.

The IP network set-up, in particular, the details of the PFIS 100 for performing the IP sequencing process, will now be discussed in more detail.

As can be appreciated by one skilled in the art, the IP network is the major communication conduit for the PFIS 100. The network is configured to use the equipment to its fullest, which requires managing of numerous IP devices in the network. A typical network in a commercial aircraft can include, for example over 1,000 IP devices; therefore, it is desirable for the network to be able to assign a respective IP address to each of these respective devices, as well as MAC addresses, while utilizing minimal bandwidth.

In one embodiment, the network employs a Broadcom BCM5318 switch chip that is integrated into a 10/100 Base-T/TX 9-Port Switch, to provide switch functionality in the ADBs 104 and SEBs 106, such as switch 118 shown in FIG. 2. However, it is noted that any suitable switch chip or switching device can be used. The address management unit of the BCM5318 switch chip provides learning and recognition functions, and the address table is capable of supporting 4K unicast destination addresses in a 256K bite on-chip memory. The address table is organized to occupy 128 2K-memory blocks indexed by bits 10:4 of the MAC address, which has 48 bits. Each 2K memory block contains 16 buckets indexed by bits 3:0. Each bucket contains two 64-bite entries, which allows up to two MAC addresses with the same indexed bits to be mapped into the address table. The switch chip can be used to index MAC addresses using a hash algorithm or a directed addressing method, which is preferable.

Every network card used in the network of the PFIS 100 uses factory-set MAC addresses. Due to the manner in which the switches route data in the network using MAC addresses, the MAC addresses are closely controlled to keep uniqueness for the network cards. The MAC addresses in this example consist of six octets, meaning 48 bits per address. The first three octets represent the manufacturer of the network card, which is obtained from the IEEE governing body to use on their network cards. For instance, in this example, the three octets are occupied by "00-06-CF" used as the MAC address, which translates into binary address "0000 0000 0000 0110 1100 1111."

An example of the relationship between the MAC addresses and these switches is shown in Table 2 below.

TABLE 1

MODULES AND THEIR FUNCTIONALITY

| Module | AVC | DSU | ADB | SEB | CMT | VDU | PDG |
|---|---|---|---|---|---|---|---|
| IP_Sequence_master_server | YES | | | | | | |
| ISMS_receiver | YES | | | | | | |
| Adb_seq_svr | | | YES | | | | |
| Adb_seq_mgr | | | YES | | | | |
| Adb_seq_receiver | | | YES | | | | |
| Seb_seq_svr | | | | YES | | | |
| Seb_seq_mgr | | | | YES | | | |
| Switch_mgr | | | YES | YES | | | |

TABLE 2

EXAMPLE OF MAC ADDRESSES

```
|---------------------48: 13 ------------------||-----12: 1 ----|
0000 0000 0000 0110 1100 1111 XXXX XXXX XXXX  0000 0000 0000
0000 0000 0000 0110 1100 1111 XXXX XXXX XXXX  0000 0000 0001
0000 0000 0000 0110 1100 1111 XXXX XXXX XXXX  0000 0000 0010

---

0000 0000 0000 0110 1100 1111 XXXX XXXX XXXX  1111 1111 1110
0000 0000 0000 0110 1100 1111 XXXX XXXX XXXX  1111 1111 1111
                                              |---- 11:1 ----|
                                                   index bits
```

As indicated, each SEB 106 has seven MAC addresses in this example, and each ADB switch has a particular table size to accommodate a particular number of SEB groups. Each switch uses 11 least significant bits (LSB) to index into the MAC address table. The 11 LSB yields 248 possible indices, with each index two entries to hold two pairs of MAC addresses at its destination port. Therefore, the table can hold a total of 4,096 MAC addresses, of which no more than two MAC addresses share the same 11 LSBs. Any MAC addresses that are not in the table will be broadcast to all ports of the network except the originating port. To prevent unnecessary bandwidth to be propagated to all ports created by the broadcast, the PFIS 100 controls the MAC addresses being used in the system.

Referring now to FIG. 7, it is assumed that each SEB 106 servicing three passengers has a total of seven devices needing MAC addresses, namely one main board, three SBDUs and three laptops. The PFIS 100 with fully populated SEBs 106 would have over 5600 MAC addresses for servicing 2400 passengers. Furthermore, it is noted that each ADB switch of an ADB 104 that services an SEB group needs to maintain the MAC addresses of all devices in its own SEB group and in all downstream SEB groups. Hence, the most upstream ADB switch in this example maintains 5,608 MAC addresses.

However, in reality, not all of the SEBs 106 will be fully populated since with current aircraft configurations, there should not be over 1,000 passengers in any one aircraft. Accordingly, the MAC address assignment is based on having a maximum of 1,000 passengers in this example. The 1,000 passenger configuration requires a maximum of 3,000 MAC devices at the seat level, which can fit into the 4K table. However, because the possibility of more than two MAC addresses sharing the same LSBs is somewhat high, the system includes software which manually assigns MAC addresses to each MAC device during the IP sequencing processes. This new MAC address is stored in a non-volatile memory to be re-used, and each MAC device shall have the ability to boot up with either the manufacturer-assigned MAC address or the dynamically-assigned MAC address during a power-up operation. The system further need a pool of MAC addresses to guarantee the existence of 4,096 MAC addresses with unique 12 LSBs, which guarantees that a maximum of two MAC addresses share 11 LSBs as can be appreciated from Table 1.

As part of the aircraft configuration, a "MAC devices to address table" is configured which identifies all devices needing MAC addresses, not counting the MAC devices not protected by the gateway, and assigned one MAC address from the list described above. The table is created such that when a switch creates the MAC address table, the devices will occupy only one entry in the index bucket, which also provides room to accommodate any MAC devices for which the system cannot assign a MAC address. Within the 11-bit index field, addresses 0 through $63_{10}$ will be used for the LRUs of the head-end equipment 102, addresses $64_{10}$-$4095_{10}$ will be used for the passenger LRUs, such as the SEBs 106 and associated equipment. The actual assignment of the MAC addresses to a specific LRU will be done as part of the creation of the specific aircraft configuration database.

As discussed briefly above, most of the LRUs, such as the SEBs 106, will have at least one IP address. It is important to note that the IP address represents the location and identity of the LRU, and hence, it is assigned dynamically per the LRUs physical location. The LRUs in the head-end equipment 102 and in the distribution boxes, such as the ADBs 104, have tray or cable-defined addressing. However, SEBs 106 do not have any external switch settings to determine its location, and thus, the location would be obtained from its associated ADB 104. Once the IP address has been assigned to an LRU, such as an SEB 106, this IP address is kept in the non-volatile memory of the SEB 106 until it is reassigned per the manual IP sequencing process as discussed in more detail below.

The following is an outline of the IP requirements for an aircraft configuration as shown in FIGS. 2 and 3. Each LRU of the head-end equipment 102 requires an IP address. There are multiple ADBs 104 on the aircraft. Each ADB 104 has one IP address, and each ADB 104 in this configuration has eight columns of SEBs 106. Each column can include up to ten SEBs 106, and each SEB 106 has a total of seven IP addresses, namely, one IP address for the main processor 116, three IP addresses for the three laptops that the SEB 106 can service, and three IP addresses for the three PDGs that the SEB 106 can service. Accordingly, based on these calculations, each column requires 70 IP addresses (seven IP addresses for each of the ten SEBs), and thus each ADB requires 561 IP addresses (its own IP address, plus eight columns of 70 IP addresses each). Hence, in this example, the total number of IP addresses required is 1,022 for the two ADBs, plus the number of IP addresses required by the LRUs in the head-end corner 102. Each IP address is divided into two parts, namely, a network part and a host part. An IP address having all ones or all zeros in its host part are reserved for the network and broadcasting. There is also one additional IP address that is conventionally used as a gateway IP address.

An example of an IP address design is shown in Table 2 below. In this example, the IP address scheme of "172.2x.y.z" will be used to assign to all devices. In this example, each LRU and the head-end equipment 102 is assigned with an IP address scheme of "172.20.y.z" and each LRU not in the head-end equipment 102, such as SEBs 106, are assigned with the IP address scheme "172.21.y.z". This class B IP addressing scheme thus provides 16 bits to represent IP addresses to physical LRU mapping. The host ID 16 bit are position numbered sequentially from the least significant bit to the most significant bit. The last significant bit is represented by "x" in Table 2 above and is used to indicate whether the LRU is part of the head-end equipment 102 or is some other type of LRU, such as an SEB 106. As discussed above, the bit "x" has a value of "0" for an LRU that is part of the head-end equipment, and a value of "1" for an LRU that is not part of the head-end equipment 102. The 16 bits represented by the letter "y" are thus used to map all of the LRUs.

TABLE 3

EXAMPLE OF IP ADDRESS FORMAT

```
|    Network ID     |        HOST ID        |
 1010 1100.0001 010x.yyyy yyyy.yyyy yyyy
    (172)  .  (20/21)
         bit to indicate headend or non-headend LRU
```

The format of the IP addresses of the LRUs that are not in the head-end equipment 102, such as the SEBs 106, is shown in Table 4 below. Specifically, bits one through four are used to identify devices within an SEB 106. For instance, all zeros will be assigned to the main processor board of the SEB 106, bits three and four represent four possible passengers, and bits one and two represent devices per passenger up to four devices. Bits five through eight are used to identify which SEB 106 is in a column to which this IP address belongs, and bits 9-12 are used to identify which column to which this IP address belongs. Specifically, bit nine represents fore and aft positions in relation to WDB/FDB, and bits 10-12 represent the column number. Bits 13-16 represent the ADB 104 to which the IP address belongs, with all insignificant bits of zeros being used to assign to the ADB on the processor board.

As indicated, bits one through four are used to represent the client processor in an LRU, bits five through eight are used to represent some classification of an LRU, bits 9 through 12 are used to indicate LRU position or frequency (multiple same-types of LRUs), and bits 13 through 16 are used to represent the LRU type.

Further examples of IP address formatting and bit representations are described in the following Tables:

TABLE 6

FURTHER EXAMPLE OF IP ADDRESS FORMAT

| Field | Bit Location | Size | Value |
|---|---|---|---|
| Header | 17-32 | 16 bits | 172.21* |
| Reserved | 16-12 | 5 bits | 0 |
| LRU/SRU Type | 11-8 | 4 bits | Based on associated numeric value (refer to "LRU/SRU Type" table below; valid range is 0-15) |
| Unit/Frequency Block "A" | 7-4 | 4 bits | Uses A-block for AVC/DSU Audio Client, Video Client and CPU client, otherwise Unit # for ADB is used (0-15). If none of the previous conditions apply, a "0" is used. Refer to "Freq. Block" table below. |
| Device Number | 3-1 | 3 bits | Based on associated numeric value (refer to "Device Number" tables below; valid range is 0-7) |

*As stated above, in one example of an aircraft application, the value "172.20" is used to represent LRUs in the head-end equipment.

TABLE 4

EXAMPLE OF IP ADDRESS FORMAT FOR NON-HEADEND LRUS

```
  0001 0101      ffff     eee     d    cccc    bb       aa
                | ADBs | Column | F/A | SEBs | Pax # | Devices | non-headend LRU of "1"
```

As can be appreciated from FIG. 2, for example, the number of IP addresses reserved for LRUs within the head-end equipment 102 is likely to be small. However, the broadcast capable DSUs 114 may have internal IP devices exposed to equipment outside the DSU 114. In order to be able to address the LRUs of the head-end equipment, and format shown in Table 5 below is used for this embodiment.

TABLE 5

EXAMPLE OF IP ADDRESS FORMAT FOR HEADEND LRUS

```
  0001    0100         dddd     cccc      bbbb       aaaa
           ↑          |LRU Type|Pos/Freq|LRU Sub ID|  clnt  |
           |
   headend IP indicator "0"
```

TABLE 7

EXAMPLE VALUES FOR A 32-BIT IP ADDRESS SCHEME

| 32 | 31 | 30 | 29 | 28 | 27 | 26 | 25 | 24 | 23 | 22 | 21 | 20 | 19 | 18 | 17 |
|---|---|---|---|---|---|---|---|---|---|---|---|---|---|---|---|
| 1 | 0 | 1 | 0 | 1 | 1 | 0 | 0 | 0 | 0 | 0 | 1 | 0 | 1 | 0 | 1 |

| 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|
| 0 | 0 | 0 | 0 | 0 | LRU/SRU Type | | | Unit/Freq. Block | | | | Dev. Number | | | |

TABLE 8

FURTHER EXAMPLE OF IP ADDRESS FORMAT

| Field | Bit Location | Size | Value |
|---|---|---|---|
| Header | 17-32 | 16 bits | 172.21 |
| ADB | 13-16 | 4 bits | Value of ADB # (0-15) |
| Column # | 10-12 | 3 bits | Value of Column # (1-5) |
| Fore/Aft | 9 | 1 bits | Fore = 0, Aft = 1 |
| SEB # | 5-8 | 4 bits | Value of SEB # (0-15) |
| Port # (Passenger #) | 3-4 | 2 bits | Value of Port # (0-3) |
| Device | 1-2 | 2 bits | Based on associated numeric value for device (refer to "Seatend Device Type" table below; valid range is 0-3) |

TABLE 9

EXAMPLE VALUES FOR A 32-BIT IP ADDRESS SCHEME

| 32 | 31 | 30 | 29 | 28 | 27 | 26 | 25 | 24 | 23 | 22 | 21 | 20 | 19 | 18 | 17 |
|---|---|---|---|---|---|---|---|---|---|---|---|---|---|---|---|
| 1 | 0 | 1 | 0 | 1 | 1 | 0 | 0 | 0 | 0 | 0 | 1 | 0 | 1 | 0 | 1 |

| 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|
| ADB Number | | | | Column # | | | F/A | SEB Number | | | | Port # | | Device # | |

The following Reference Tables represent examples of the number codes that can represent the types of devices in the PFIS 100.

TABLE 10

LRU/SRU TYPE TABLE

| Type | Name |
|---|---|
| 0 | ADB |
| 1 | AVC |
| 2 | DSU |
| 3 | V/C |
| 4 | A/C |
| 5 | CMT |
| 6 | Test Equipment |

TABLE 11

SEATEND DEVICE TYPE TABLE

| Type | Name |
|---|---|
| 0 | PCU |
| 1 | PDG |
| 2 | PED/LAPTOP |
| 3 | SVDU |

TABLE 12A

DEVICE NUMBER TABLE
Video Device #

| Slot # | Slot ID | Value |
|---|---|---|
| 2 or 9 | 1 or 10 | 0, 1 |
| 4 or 11 | 3 or 12 | 2, 3 |
| 5 or 8 | 5 or 8 | 4, 5 |
| 10 | 11 | 6, 7 |

TABLE 12B

DEVICE NUMBER TABLE
Audio Device #

| Slot | Value |
|---|---|
| Any | 0, 1, 2, 3 |

TABLE 12C

DEVICE NUMBER TABLE
Other Device #

| Type | Value |
|---|---|
| ADB | 1 |
| AVC | Enet Port #(0-2) |
| DSU | Enet Port #(0-2) |
| CMT | 0 |

The operations pertaining to the IP sequencing process will now be described.

In order for the IP sequencing process to identify the SEBs 106, the process requires a database to identify the aircraft's configuration. This database defines the number of ADBs 104 in the system, as well as the number of columns being serviced by the ADBs and the number of SEBs 106 in the columns. The database also defines the location identity of each SEB 106 for their location as determined during the sequencing. Contents of the database can include the host name, the ADB number, column INFO such as column number and whether the column is a FWD or AFT column, SEB index, IP addresses, MAC addresses, Ethernet switch numbers and port numbers, and seat device INFO.

A summary of the IP sequencing process is as follows. Specifically, the system starts with the IP sequence server running on the AVC, ADB, SEB, PDG and SVDU as shown, for example, in FIG. 3. Each IP sequence server is listening to a UDB for a command. When the IP sequencing is started by the command entered, for example, from the CMT 110 by accessing a web page generated by the AVC 108, the AVC 108 sends an IP sequence start message to all of the ADBs 104. After an ADB 104 receives a start command, it disconnects all switch ports to isolate itself. Each ADB 104 then starts opening one switch port at a time to a column of SEBs 106 to send sequencing start messages to the SEBs 106. Each sequencing start message include information identifying the ADB 104 and column number to which the SEB 106 is listening, and the UDB port number to be used during the sequencing. When an SEB 106 receives the message, it disconnects itself from all downstream switch ports, and thus the SEB 106 will communicate with one column and all other SEBs 106 will be waiting to be connected during their sequencing process. The SEB 106 begins a sequence manager thread to listen to a designated UDB port for sequencing.

Once all of the columns have been sequenced, the ADP will reconnect all switch ports. The ADB 104 manages the IP sequencing by having column managers to sequence all columns simultaneously. It is noted that only one SEB per column can listen to a broadcast message. The ADB 104 sends a broadcast message using the unique UDB port targeting the SEBs 106 on this column and the broadcast message contains IDP information for the first SEB 106 on that column. When the first SEB 106 receives this message, it saves this new IP address to be used at a later time. The SEB 106 assigns any other seat components attached to it with a new IP address, and reconnects itself to the downstream link to the next SEB 106. The SEB 106 also sends a "thank you" message back to the ADB 104, which can be referred to as an acknowledgement ACK message. The final step, the SEB 106 assigns new IP addresses that are active and terminates the sequence manager's thread to ignore any other hello messages. The ADB or manager receiving the thank you message repeats the above process for all the SEBs 106 in one column. When the ADB 104 finishes its column, it sends a column done message to the server and the AVC 108. When all columns are completed, the IP sequencing process has been completed.

It is noted that certain operations can be performed that can be defined as pre-processing or set-up operation for the network. All LRUs boot with pre-assigned IP and MAC addresses in their non-volatile memories as discussed above, and valid aircraft configuration is loaded into all ADBs 104. The LRUs in the head-end equipment 102 and in the ADBs 104 will obtain their IP address per their hardware indication.

Figure 8:
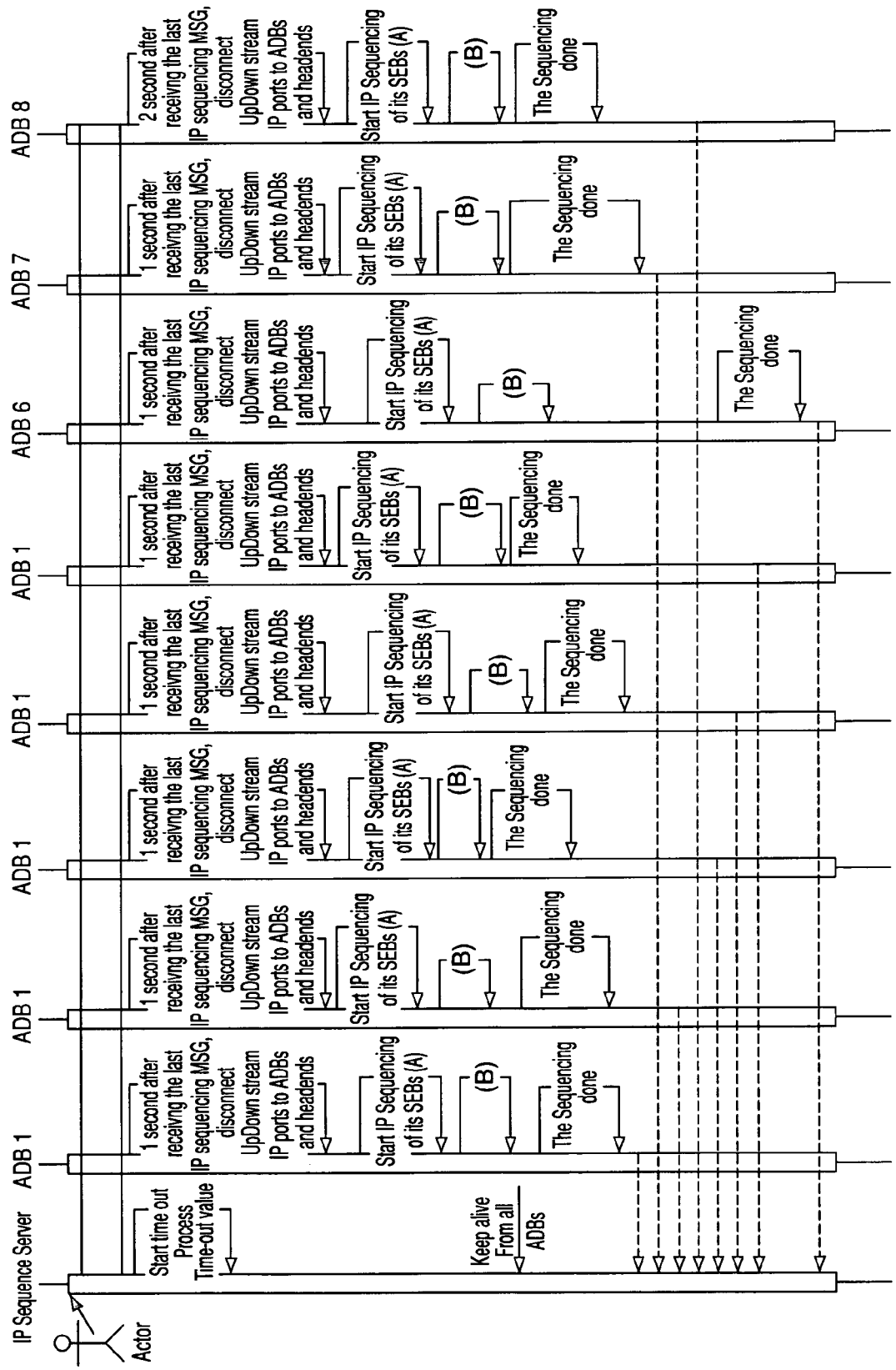
FIG. 8 is a sequence diagram illustrating an example of the communications and operations of the IP sequencing server and ADBs of the system shown in FIGS. 1 and 2 during an IP sequencing operation according to an embodiment of the present invention.
Figure 9:
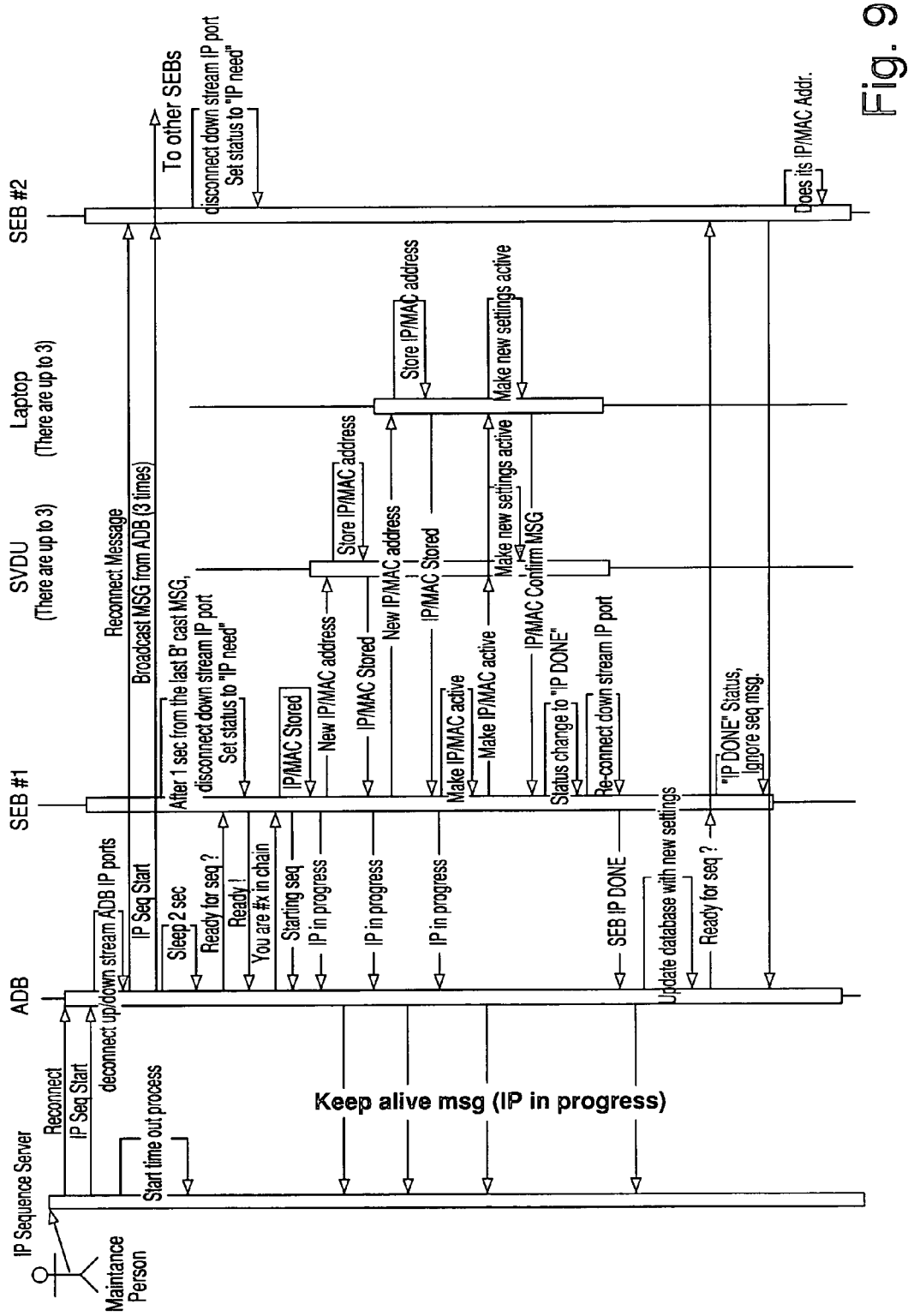
FIG. 9 is a sequence diagram illustrating an example of the communications and operations of the IP sequencing server, an ADB, an SEB and its respective SVDUs and USBs, and a second SEB, of the system shown in FIGS. 1 and 2 according to an embodiment of the present invention.
Figure 10:
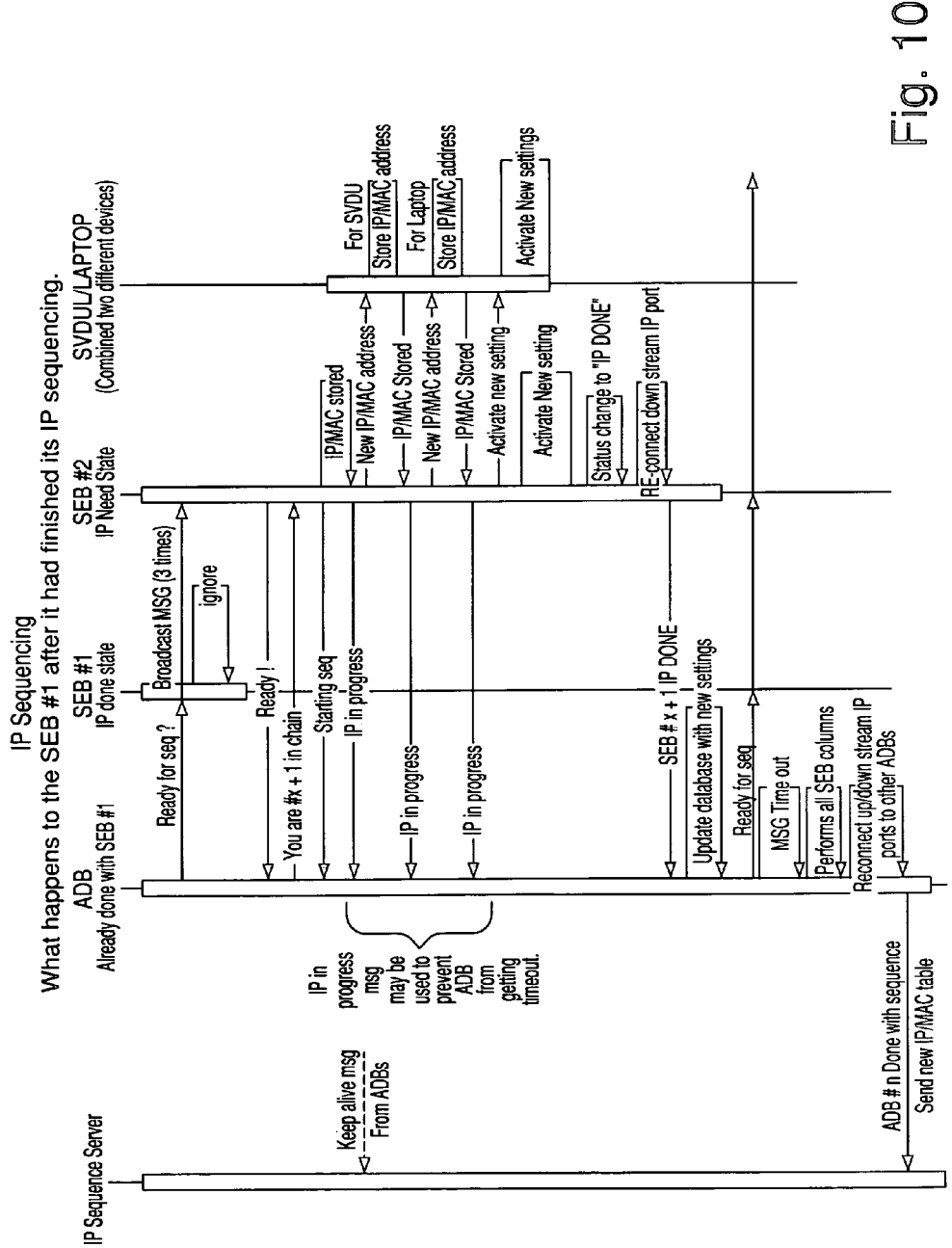
FIG. 10 is a sequence diagram illustrating an example of the communications and operations of an IP sequencing server, an SEB that has completed the IP sequencing operations as shown in FIG. 9, and a second SEB and its respective SVDUs and USBs, of the system shown in FIGS. 1 and 2 according to an embodiment of the present invention.

As stated above and as shown conceptually in the process diagrams of FIGS. 8 through 10, maintenance crew personnel can initiate IP sequencing via the CMT 110. To find an IP address for an SEB 106 located at a certain position on one column being serviced by an ADB 104, it is necessary to determine which ADB 104 the SEB 106 is attached, which column on the ADB 104 that the SEB 106 is attached, whether the SEB 106 is on a forward or aft column, the position number in the series of SEBs 106, and the device identifier which indicates whether the device is an SEB 106 or some other type of LRU, such as a PDF, SVDU or PED.

As discussed above, the IP sequencing process isolates each SEB 106 so that it can communicate with its respective ADB 104 one on one. This process can be very time consuming. However, to make the process more efficient, each column on the ADB 104 will use a unique UDP port number to communicate, and each SEB 106 will only listen to that UDP port. Therefore, the ADBs 104 can sequence all columns that they are servicing at the same time to reduce the amount of time necessary to the time that it takes for an ADB to service its longest column.

Typically, there are five columns being serviced by each ADB 104. Each column has two Ethernet columns which are separated at a wall disconnect WDC as a forward seat group (FWD) and aft seat group (AFT). Therefore, each column has two subcolumns of SEBs 106. For ease of programming, the five columns can be converted to ten columns using the conversion factor shown in Table 13 below.

TABLE 13

EXEMPLARY FORMULA FOR CONVERTING COLUMNS

| | |
|---|---|
| #define FWD | 0 |
| #define AFT | 1 |
| ... | |
| // seat_column: New software column | |
| // column: Column defined in the database | |
| // fwdaft: Is this seat attached to FWD or AFT of WDC. | |
| seat_column = (column − 1) * 2 + fwdaft | |

All SEBs 106 will have an IP sequencing server module 146 (see FIG. 3) running and entering a single UDP port. The ADB number and column number and direction of the message are used to determine the UDP port that any column will be using. In order to get real port number, the IP sequencing process uses the block of UDP port numbers starting at 25,000 to 26,000 as described in the following processing shown in Table 14 below.

TABLE 14

EXAMPLE OF PROCESS TO OBTAIN UDP PORT NUMBER

```
/*******************************************
*       Define UDP ports
*
*       Make sure that the port number
*       matches the ADB no!
```

TABLE 14-continued

EXAMPLE OF PROCESS TO OBTAIN UDP PORT NUMBER

```
**********************************/
#define AVC_TO_ADB            0        //PORT offset to be used with their base number.
#define ADB_TO_SEB            1
#define SEB_TO_ADB            2
#define ADB_INC_FACTOR        100      // Each column PORT starts at 100 inc.
#define ADB_COL_INC_FACTOR    5        // Each column PORT starts at 5 inc.
#define ISMS_BASE_PORT        25000    // All IP Sequencing will be after 25000
#define ISMS_PORT             25001    // Port number to be assigned to ADB to AVC
#define SEB_COMMON_PORT       25010    // Common Port which all SEB will be listening
from.
#define ADB_1_ISMS_PORT 25100
#define ADB_2_ISMS_PORT 25200
#define ADB_3_ISMS_PORT 25300
#define ADB_4_ISMS_PORT 25400
#define ADB_5_ISMS_PORT 25500
#define ADB_6_ISMS_PORT 25600
#define ADB_7_ISMS_PORT 25700
#define ADB_8_ISMS_PORT 25800
int get_ADB_PortNO (CHILD_THREAD adb_no)
{
    // if a valid adb no, return a port number.
    if ((adb_no >= 0) && (adb_no < MAX_ADB_THREAD))
        return (25000 + ((adb_no + 1) * 100));
    return 0;
}
int get_column_port (int column, int offset)
{
    if ((column >= 0) && (column < 10))
        return ((ADB_COL_INC_FACTOR * column) + offset);
    return 0;
}
```

The IP sequencing process uses UDP ports from 25,000 to 25,999. From this range, each ADB 104 takes a block of 100 ports starting from port 25,100. Each column in an ADB 104 uses five ports, and they are designed in the direction of the message. For example, if a port is used between AVC 108 to an ADB 104, the offset is zero. From an ADB to an SEB, the offset is one, and from an SEB to an ADB the offset is two. The function shown in the software in Table 13 above identified as "get_ADB-PortNo" returns the UDB base port of the ADB 104. The function "get_column_port" returns the offset for the column by which the function is called. Adding both the ADB base port and offset number provides the UDB port for that specific column in the direction of the message. Hence, the offset should be zero, one or two.

The ADB 108 will handle the columns of SEBs 106 in a sequential manner, even if some of the SEBs 106 are forward columns and some are aft columns as described above. Basically, a column having forward and aft SEBs 106 will be viewed as two columns, and thus, in this example, there are a total of ten possible columns without having reference to forward and aft. The SEB 106 has a sequence status "IP Needed" which means that that SEB 106 is waiting to be discovered by the ADB 104, "IP Obtain" which indicates that the IP address has been obtained but sequencing is in process, "IP Ignore" which means that, for example, a switch port in that SEB 106 is malfunctioning and therefore this SEB 106 should not obtain an IP address, and "IP Done" which means that the IP sequencing for that SEB 106 has been completed.

Real time processing can occur when the maintenance crew, for example, initiates IP sequencing via the CMT 110 as shown in FIG. 8. In response to this command, the IP sequence master server 160 (see FIG. 3) in the AVC 108 of the head-end equipment 102 will set its system mode to "sequence" and will generate a heartbeat message that transmits this information to all LRUs via the Ethernet as discussed above with regard to FIGS. 1 and 2.

It is noted that the same message structure will be used over the Ethernet as well as in for the queue in the IP sequence server, so that messages can be easily router from one processor to another with minimal changes. Hence, and ADB 104 can receive a message from the AVC 108 and send that message to the SEBs 106 with very minimal changes to the original message, thus reducing the change for possible mistakes in translating one type of message to another. Examples of message structures and message types are shown in Tables 15 and 16 below:

TABLE 15

EXAMPLES OF MESSAGE STRUCTURE

```
typedef struct {
    char name[MAX_HOST_LEN + 1];
    char adbNbr;
    char colNbr;
    char foreAft;
    char sebNbr;
    char ipAddress [IP_ADDRESS_LEN+1];
    char macAddress [MAC_ADDRESS_LEN+1];
```

TABLE 15-continued

EXAMPLES OF MESSAGE STRUCTURE

```
    char serial_no [SERIAL_NO_SIZE + 1];
    char switchNbr;
    char portNbr;
    char device_cnt;
} SEB_ADDR_S;
typedef struct {
long ipc_msg_type; // This field is only used for IPC level. It must be > 0.
    unsigned int    msg_cnt;
    unsigned char   source;              //MODULE_NAME source;
    unsigned char   source_thread;       //CHILD_THREAD source_thread;
    unsigned char   target;              //MODULE_NAME target;
    unsigned char   target_thread;       //CHILD_THREAD target_thread;
    unsigned char   msg_type;            //IP_SEQ_MESSAGE_TYPE msg_type;
    unsigned char   ADB_index;
    unsigned char   column_index;
    unsigned char   SEB_index;
    char serial_no  [SERIAL_NO_SIZE + 1];
    char ipaddress  [15];
    SEB_ADDR_S seb_data;
//  DEV_REPLY_INFO device;    // to be used later
} Q_MSG_DESCRIPTION;
```

TABLE 16

EXAMPLES OF MESSAGE TYPES

```
typedef enum {
    iStart,
    iCancel,
    iInprogress,
    iCancelComplete,
    iRetry,
    iAssign,
    iAssign_done,
    iTerminateProcess,
    iDisconnected,
    iIP_Complete,
    iIP_Questionable,
    iHello,
    iThankyou,
    iYou_Welcome,
    iTimer,
    iOut_of_Sequence,
    iSwitch_Connect_ACK,
    iSwitch_Disconnect_ACK,
    iSwitch_Connect_NAK,
    iSwitch_Disconnect_NAK,
    iTroubleReport,
    iNULL_TYPE
} IP_SEQ_MESSAGE_TYPE;
```

The following Tables illustrate examples of messages transferred between components of the PFIS 100.

As shown in Table 17, the ISMS master and its child thread communicate with multiple queues. The communication is single direction using a queue.

TABLE 17

MESSAGE FROM ISMS MASTER TO CHILD THREAD

| Purpose | Variable | Value |
| --- | --- | --- |
| Start IP Sequencing | msg_type | iStart |
| Cancel IP Sequencing in progress | msg_type | iCancel |

As shown in Table 18, the communication between ISMS and CGI are one way from CGI to ISMS via an ISMS queue.

TABLE 18

MESSAGE FROM CGI TO ISMS

| Purpose | Variable | Value |
| --- | --- | --- |
| Start IP Sequencing | msg_type | iStart |
| Cancel IP Sequencing in progress | msg_type | iCancel |

As shown in Table 19, the communication between the ISMS child thread to ADB is via UDP. The UDP port number is calculated by the get ADB_PortNo, and for this port, and offset of AVC_TO_ADB is used which is zero.

TABLE 19

MESSAGE FROM ICDS CHILD THREAD TO ADBS

| Purpose | Variable | Value |
| --- | --- | --- |
| Start IP Sequencing | msg_type | IStart |
| Cancel IP Sequencing in progress | msg_type | ICancel |

As shown in Table 20, the communication from ADB to ISMS (the ISMS receiver) is via TCP. The port number which all ADB uses to this TCP socket is ISMS_PORT (25001).

TABLE 20

MESSAGE FROM ADB TO ISMS

| Purpose | Variable | Value |
| --- | --- | --- |
| ADBs are disconnecting Ethernet | msg_type | IDisconnected |
| In Progress (Prevent Timeout) | msg_type | I1nprogress |
| Cancel in Progress (Prevent Time out) | msg_type | ICancelInprogress |
| Cancel Completed | msg_type | ICancelComplete |
| IP Seq. Completed | msg_type | iIP_Complete |
| ADB timed out | msg_type | iIP_Timeout |

The above messages are being used to inform the ISMS of how ADBs 104 are performing their IP sequencing. The message iInprogress and iCancelInprogress are used to prevent the ISMS from being in timeout. The ADBs 104 will send in progress messages after completion of each SEB 106, and the ISMS will update the WEB 172 (see FIGS. 5 and 6) with its status.

Returning now to the discussion regarding the flow diagrams of FIGS. 8 and 9, after a short time delay (e.g., one or two seconds) after receiving the latest "start IP sequencing" message, each ADB 104 disconnects its Ethernet switch ports to all ADBs and/or LRUs in the head-end equipment 102. This is done so that all SEBs 106 on one ADB 104 is isolated from other ADBs 104. Each ADB 104 has ten columns and one Ethernet port on each column in this example. Each ADB 104 simultaneously manages an "IP sequencing" column by column as discussed below.

Each ADB 104 then opens an Ethernet port to one SEB column to set up for IP sequencing. The ADB will send three identical "IP start" broadcast messages to the SEBs 106 in that column at intervals that are spaced apart by a predetermined period of time, such as 100 microseconds apart in this example. In this broadcast message, the ADB 104 will include its ADB number the column on which it is working. All SEBs 106 receiving the IP sequence message will then perform the following operations as shown in the flow diagram of FIG. 9.

An SEB 106 will open a second UDP port unique to its ADB 104 and its column. The unique UDP port will be calculated using the number of the ADB 104 and the column number embedded in the IP start message. This ensures that all calls can be simultaneously sequenced/

The SEB 106 will then enter a "sleep mode" for one second (on any other suitable amount of time) after receiving the IP sequencing message. The sleep mode is necessary to give enough time for the downstream SEBs 106 to receive the IP sequence broadcast message from the ADB 104. The SEB 106 disconnects its downstream IP port to downstream SEBs 106, and hence, only the first SEB 106 in the column will be connected to the ADB 104. If the SEB 106 cannot disconnect its IP port, it retries two more times in this example. If it is unable to close the port, this SEB 106 is marked as having the status "IP ignore" which would lead the process to discover this SEB 106 as a missing SEB 106. The SEB 106 then sets the sequence to "IP needed" if the switch is working properly.

Further in this example, after ten seconds, the ADB 104 moves to the next column by closing Ethernet ports at the current column and opens the next port. The processes discussed above with regard to the SEBs 106 in that new column are then repeated. After all columns are completed, the ADB 104 reconnects all Ethernet ports. After having opened all Ethernet ports, all SEBs 106 in each column will be sequenced simultaneously as shown in FIG. 8. Specifically, each ADB 104 starts the discovery process of each column simultaneously. Specifically, each ADB 104 disconnects all Ethernet ports to the SEB columns, which, in this example, amounts to ten columns, simultaneously by addressing each column in a different UDP port. The ADB 104 sends broadcast discovery messages with the SEB Ethernet information for the first SEB 106 out to each port. The message for each column will have the Ethernet information for that column. The ADB 104 waits ten seconds (or any other suitable amount of time) to get a reply from any SEB 106. If there is no reply, the ADB 104 will note that the column to be "done" or "incomplete" based on the database configuration for this condition. Any SEB 106 receiving this discovery message with a sequence status of "IP done" ignores this message, and each SEB 106 receiving the discovery message that does not have this "IP done" status will proceed as follows.

Specifically, that SEB 106 sent a message back to the ADB 104 notifying that this SEB 106 has received this message, and obtains and assigns IP, MAC and hostname information embedded in the discovery message. The SEB 106 stores the new IP and MAC address to its non-volatile memory, and also assigns IP and MAC addresses to all devices including the SVDU, for example, directly connected to this SEB 106. The SEB 106 reconnects the downstream Ethernet ports to the next SEB 106, and the next SEB 106 can therefore be discovered. The SEB 106 sends a message to the ADB 104 that it has completed its assignment, and then closes the second UDP socket so that it will ignore any other discovery messages. The SEB 106 then sets its status to "IP done." The ADB 104 receives the message from the SEB 106 indicating "IP done" and the ADB 104 continues its discovery process on the current SEB column until it receives a time out. Once all ADBs 104 are done performing these operations, the IP sequencing process is finished. At the end of the IP sequencing processes, all LRUs should be set with a new MAC and EP address. At this time, all switches rebuild their respective MAC address destination tables. It should also be noted that when an SEB 106 receives its IP address from its ADB 104, the SEB 106 also receives SVDU IP as well. Once the SEB 106 receives the SVDU IP, the SEB 106 closes all of its Ethernet ports except the one to the first SVDU 120. The SEB 106 then sends a UDP broadcast MSG packet which includes the IP and MAC address. Once the first SVDU 120 receives the packet, the SVDU 120 checks to see if the IP included in that packet is different from its current set IP. When the received IP/MAC address information is different, the SVDU 120 will store this new information as its IP/MAC and reboot itself. However, if the IP/MAC address information is same as what the SVDU 120 has stored, the SVDU 120 will ignore the packet.

Figure 29:
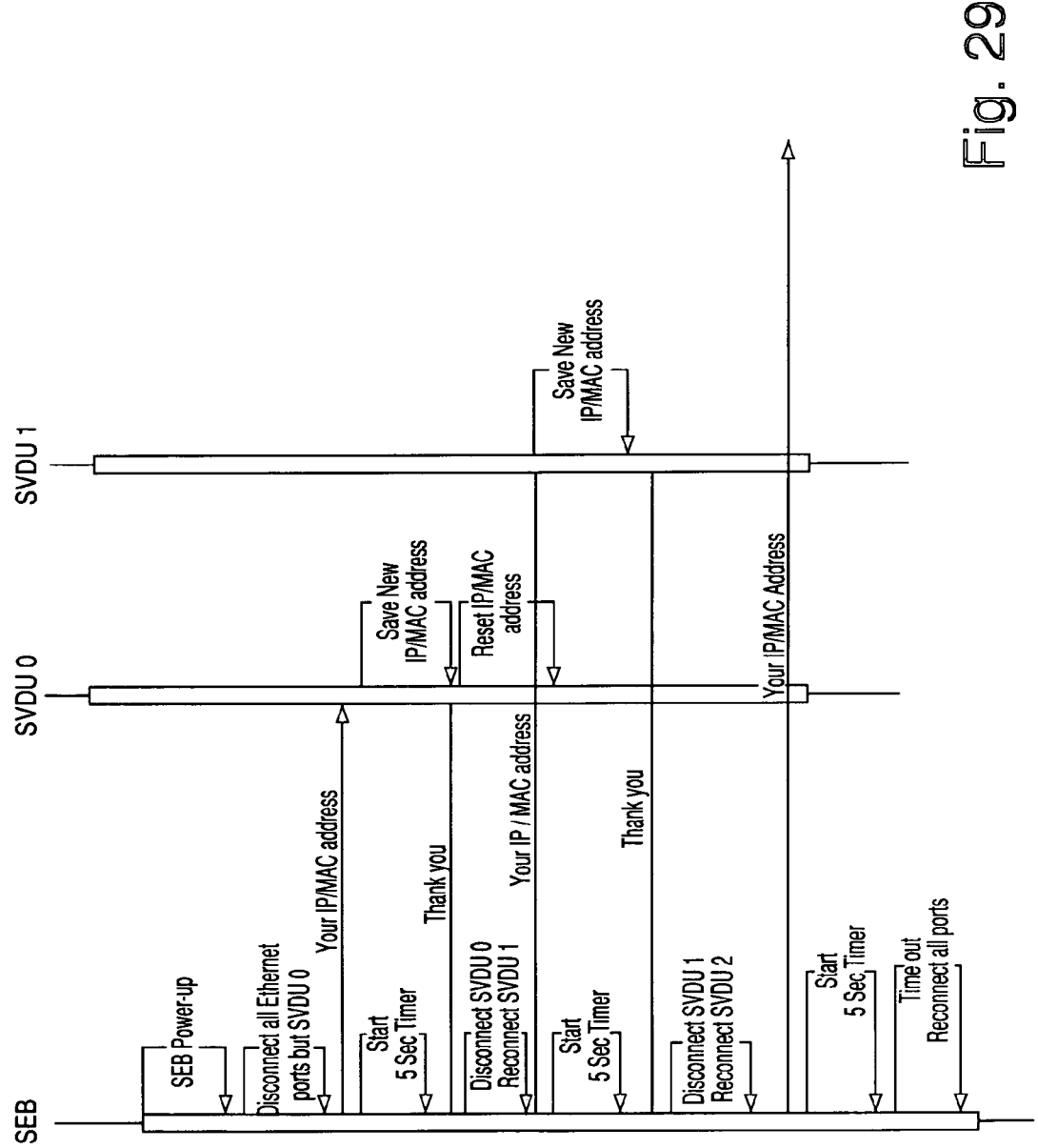
FIG. 29 is a flow diagram illustrating an example of operations of an SEB and its SVDUs of the system shown in FIGS. 1 and 2 during its IP sequencing of its SVDUs during power up of the SEB according to an embodiment of the present invention.
Figure 30:
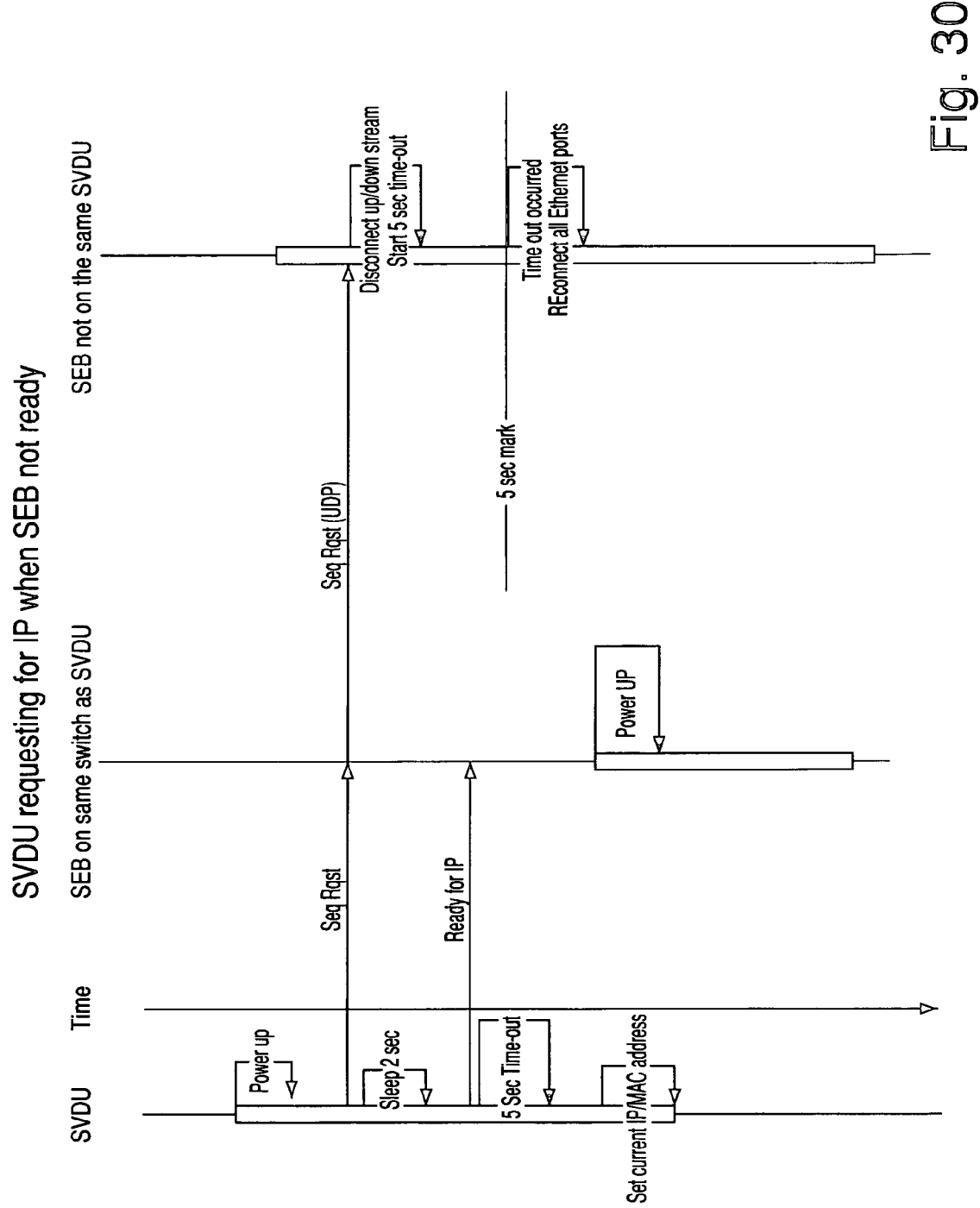
FIG. 30 is a flow diagram illustrating an example of operations of an SEB and its SDVUs of the system shown in FIGS. 1 and 2 during its IP sequencing of its SVDUs when the SVDUs request IP addresses according to an embodiment of the present invention.
Figure 31:
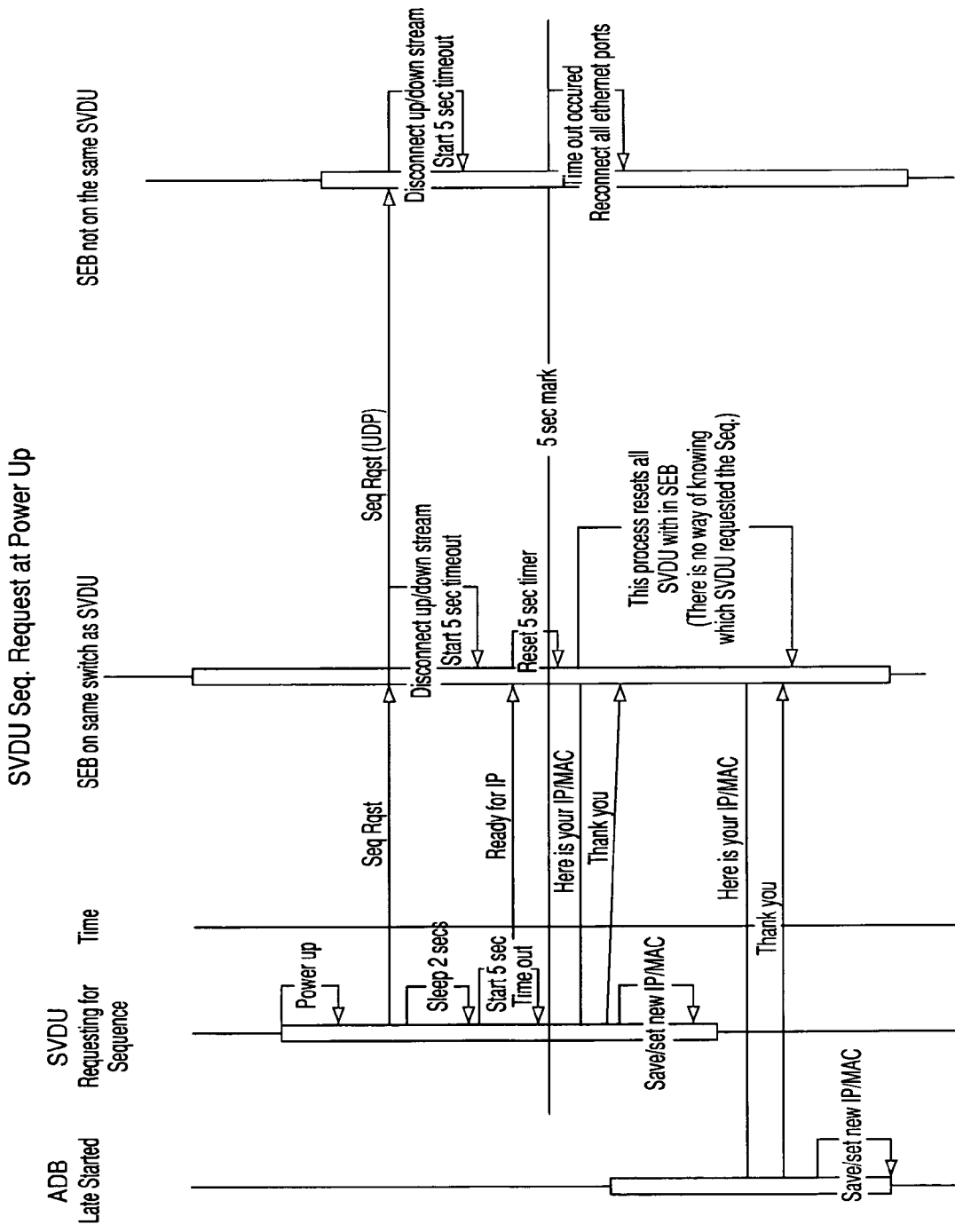
FIG. 31 is a flow diagram illustrating an example of operations of a SEB and its SVDUs of the system shown in FIGS. 1 and 2 during its IP sequencing of its SVDUs when the SVDUs request IP addresses at power up according to an embodiment of the present invention.

Accordingly, the steps relating to the IP sequencing operations for the SEB 106 and its related devices, such as the SVDU 120, can be summarized as follows, and are shown in the flowcharts of FIGS. 29-31:

1. An SEB receives its IP address and MAC along with its attached devices (SVDU, PDG, . . .)
2. SEB assigns its own IP.
3. SEB closes all Ethernet ports but one to one SVDU.
4. SEB saves SVDU's IP/MAC as a file.
5. SEB sends UDP broadcast MSG containing SVDU IP/MAC and SEB IP, reaching only one SVDU.
6. SVDU receiving its EP/MAC and hosting SEB IP, it sends OK MSG back to SEB.
7. SVDU meantime check to see if new IP/MAC and SEB IP is new information.
    a. If new, it will write it to a file and reboot.
    b. If same as old, SVDU will ignore
8. SEB receiving an OK MSG from SVDU or time out due to missing SVDU, SEB closes the only open Ethernet port and opens next ports to the $2^{nd}$ SVDU.
9. Repeat process until all SVDUs have been sequenced.

The SEB Host IP address obtained by SVDU during its sequence can then be used to obtain new IP address at boot time.

Figure 11:
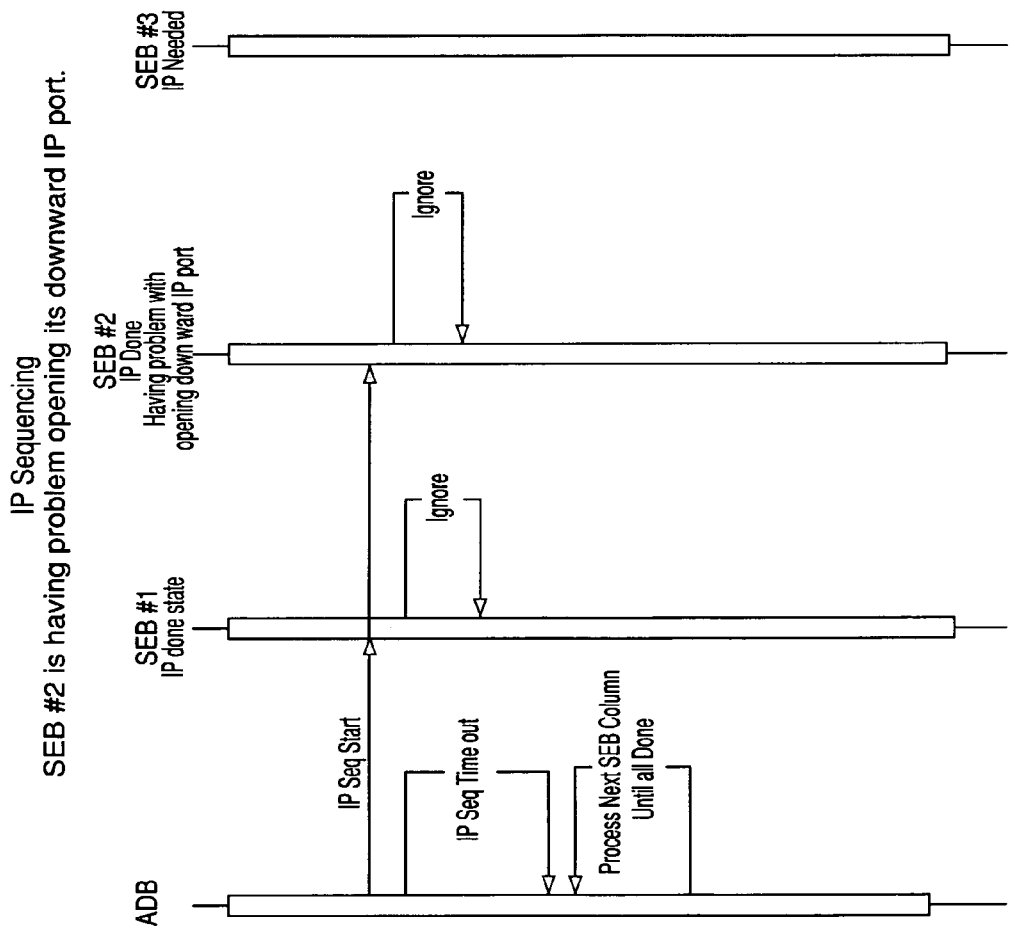
FIG. 11 is an example of a sequence diagram of the communication and operations performed when the second SEB shown in FIGS. 9 and 10 is having difficulty opening its downward IP port according to an embodiment of the present invention.
Figure 12:
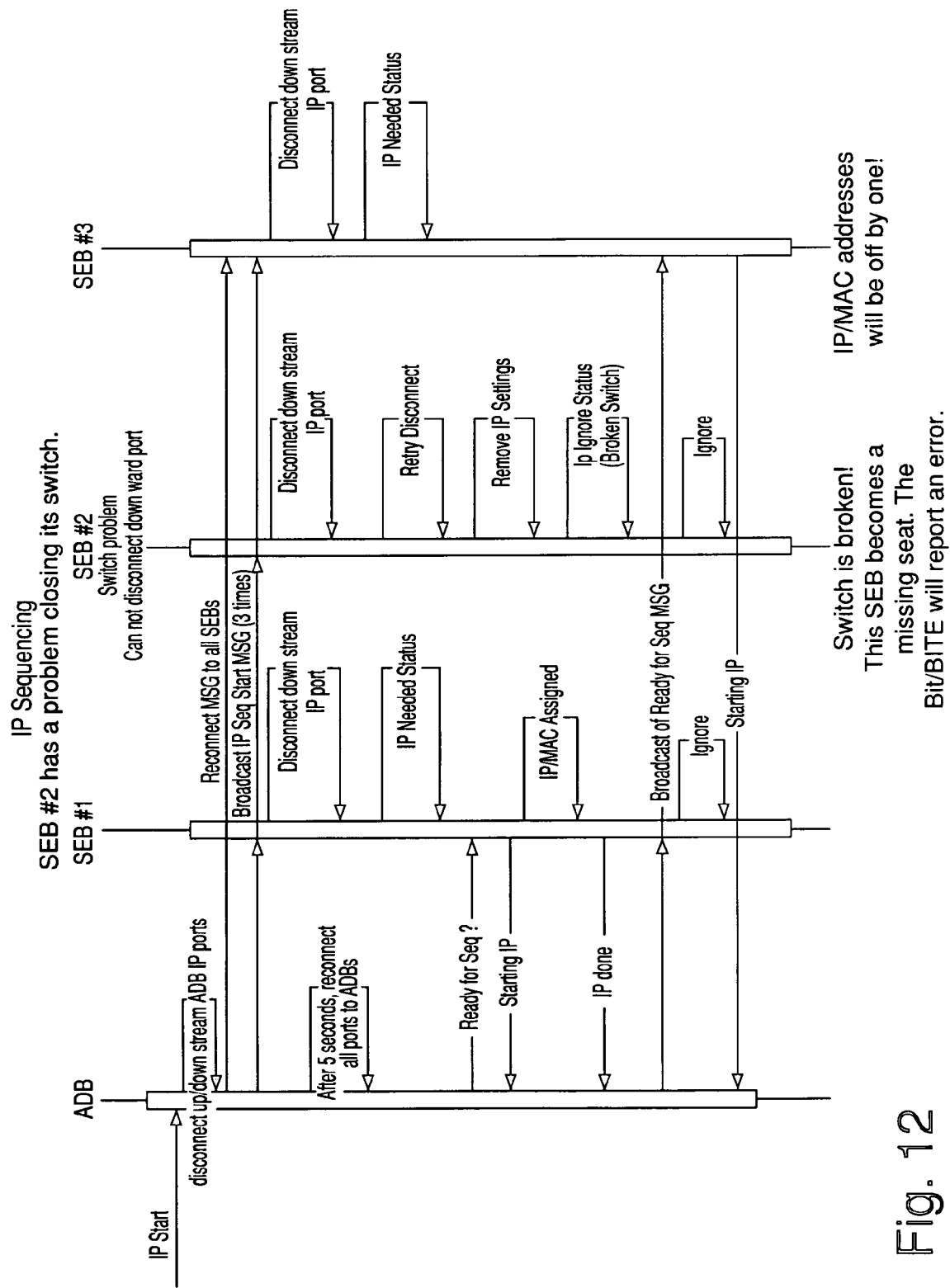
FIG. 12 is an example of a sequence diagram of the communication and operations performed when the second SEB shown in FIGS. 9 and 10 is having difficulty closing its switch according to an embodiment of the present invention.

It is noted that during the IP sequencing operation, certain problems can arise. For example, as shown in FIG. 11, if the second SEB 106 in a column is having difficulty opening its downward IP port, the IP sequencing process will process another column. However, the ADB 104 controlling the SEB column having the SEB 106 with the problem IP port will report and error message indicating missing seats to the head-end equipment 102 since the seats services by those SEBs 106 downstream of the problem SEB 106 will be unable to be given IP addresses and thus will be identified as missing. Similarly, if an SEB 106 in a column is having difficulty in closing its switch, the seats being serviced by that problem SEB 106 will be identified as being missing, and the ADB 104 will report an error message indicating missing seats to the head-end equipment 102.

Figure 13:
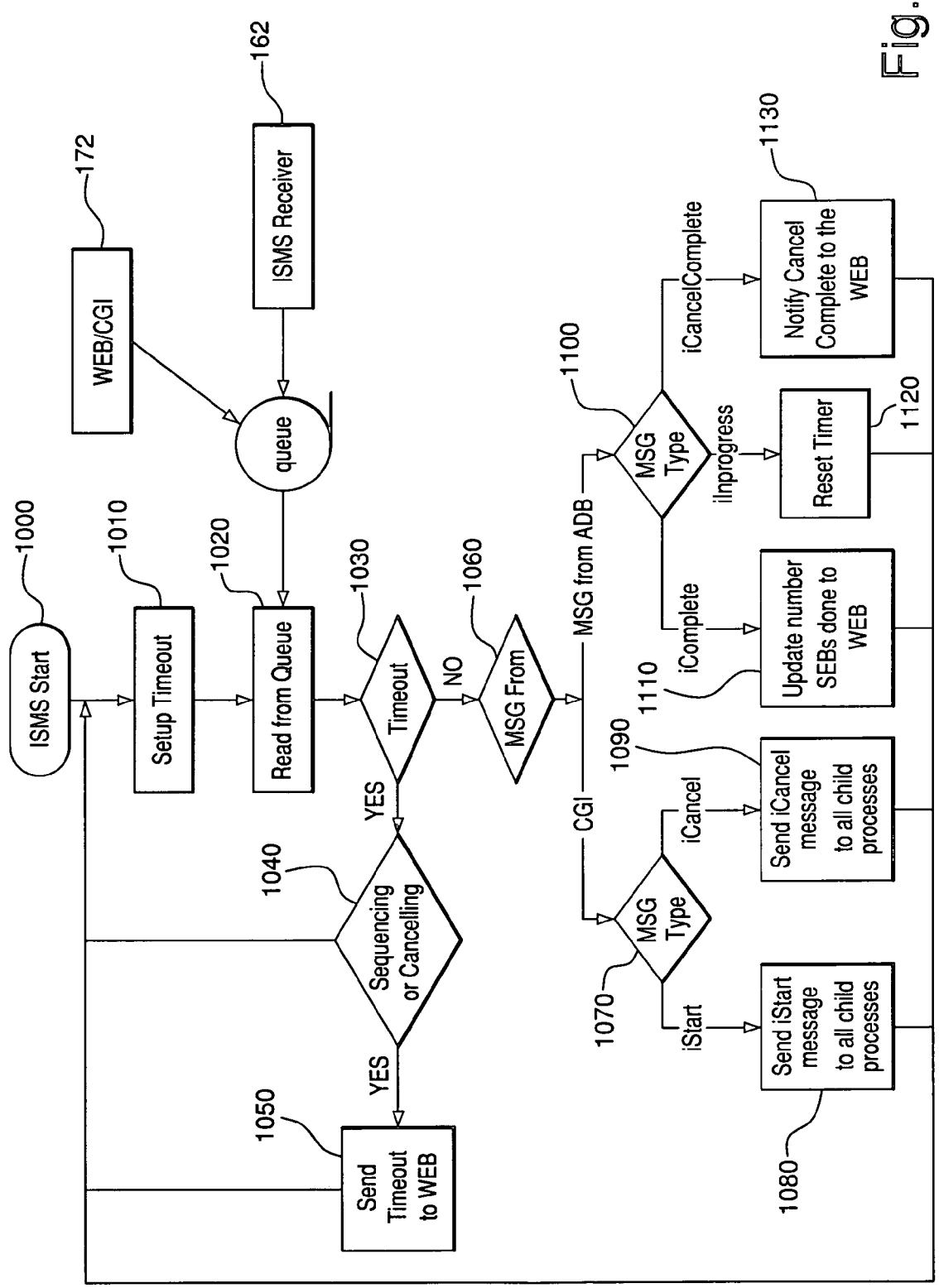
FIG. 13 is a flowchart showing an example of operations performed by the IP master server during the IP sequencing operations shown in FIGS. 8-10 above according to an embodiment of the present invention.

FIG. 13 is a flowchart showing an example of operations performed by the IP master server during the IP sequencing operations shown in FIGS. 8-10 and discussed above according to an embodiment of the present invention. As indicated, in step 1000, the IP sequencing master server (ISMS) will begin the IP sequencing processing and setup the timeout conditions in step 1010. In step 1020, the ISMS will read from the queue information provided by the WEB/CGI 172 and ISMS 162. If the timeout has occurred in step 1030, the ISMS will determine in step 1040 if the IP sequencing or cancel IP sequencing is to be performed. If not, the process returns to step 1010, but if so, the ISMS sends the timeout info to the WEB/CGI in step 1050 and the operation returns to step 1010 and repeats as above.

However, if it is determined in step 1030 that the timeout has not occurred, the ISMS will determine in step 1060 whether a message has been received from the CGI or ADB. If the message was from the CGI, the process in step 1070 will determine the message type. If the message is a start message, the ISMS will send a start message to all child processes in step 1080, and the processing returns to step 1010. However, if the message is a cancel message, the ISMS will send a cancel message to all child processes in step 1090, and the processing returns to step 1010. If it is determined in step 1060 that the message is from and ADB 104, the process in step 1100 will determine the message type. If it is a completed message, the number of SEBs completed is updated in the WEB/CGI 172 in step 1110 and the processing returns to step 1010. If the message indicates that sequencing is in process, the timer is reset in step 1120 and the processing returns to step 1010. If the message indicates that sequencing is canceled, the WEB/CGI 172 is notified in step 1130 and the processing returns to step 1010.

Figure 1:
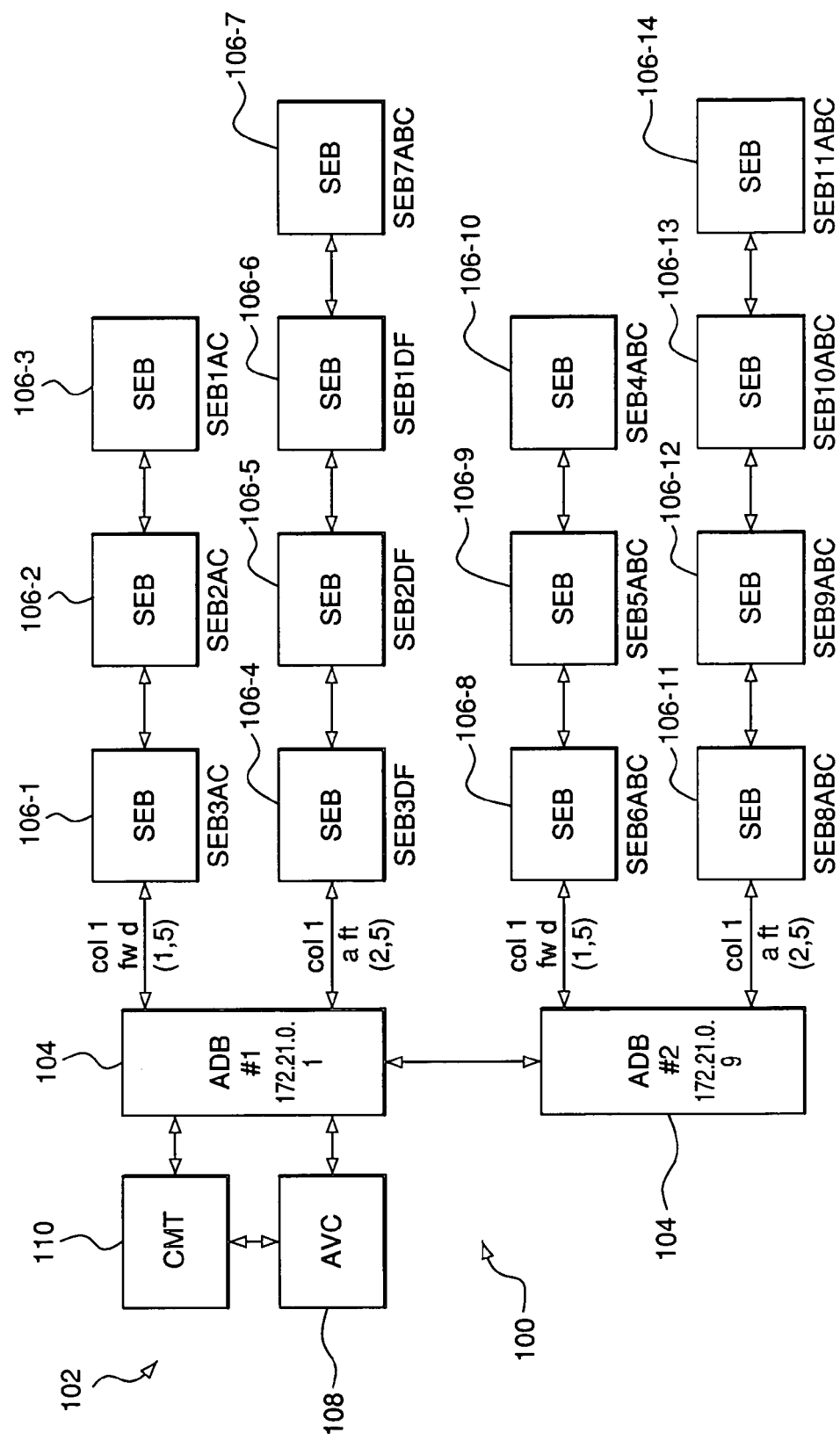
FIG. 1 is a conceptual diagram of a typical seating arrangement, such as that employed in a passenger aircraft, employing an Internet Protocol (IP) sequencing system and method according to an embodiment of the present invention.
Figure 14:
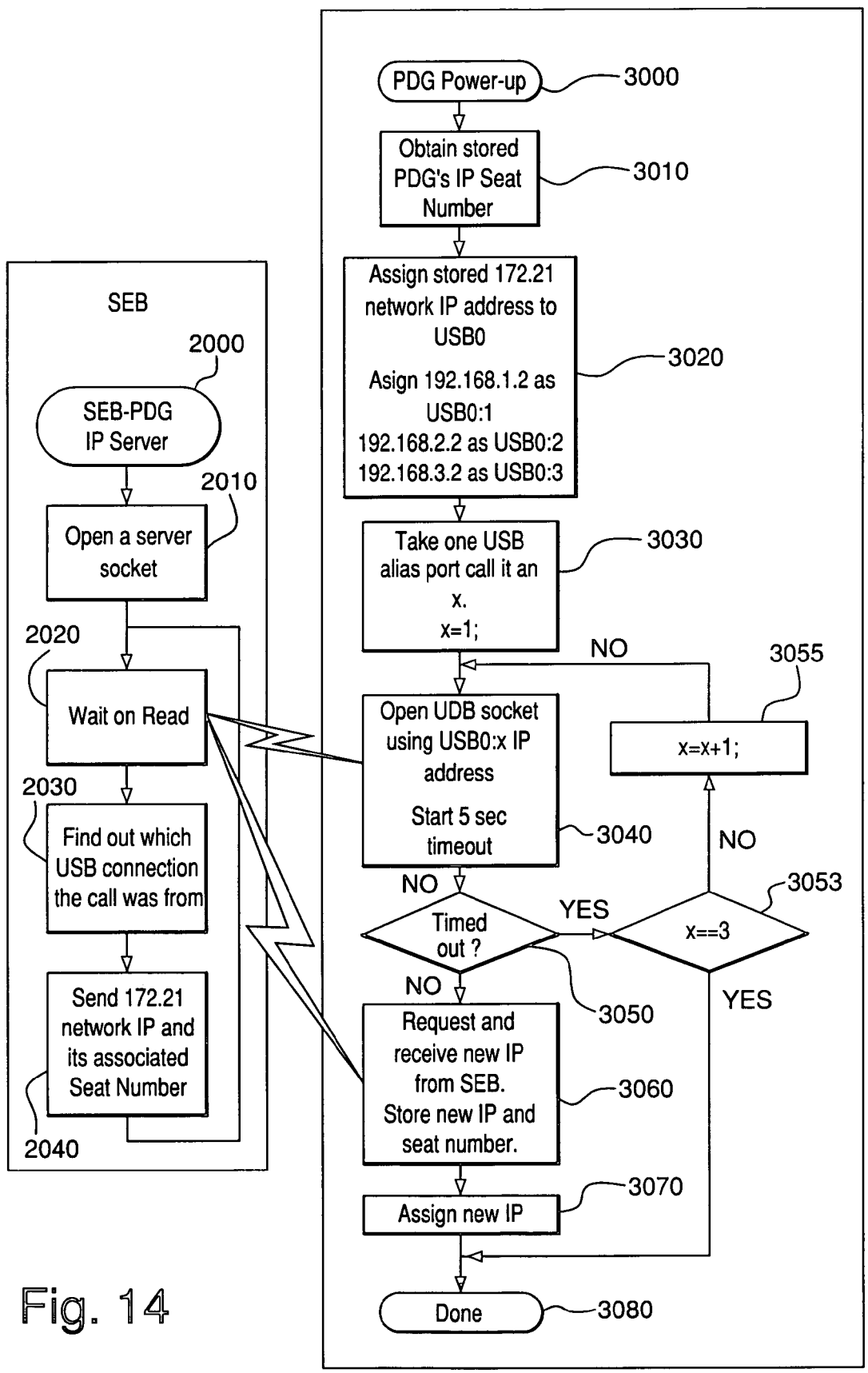
FIG. 14 is a flowchart showing an example of the operations performed by an SEB and a PDG of the system shown in FIGS. 1 and 2 during an IP sequencing operation according to an embodiment of the present invention.

An example of the operations performed by an SEB 106 and a PDG of the system shown in FIGS. 1 and 2 during an IP sequencing operation as discussed above with regard to FIGS. 8-10 are shown in FIG. 14. As indicated, for an SEB 106, the operation starts in step 2000, and the SEB 106 opens a server socket in step 2010. In step 2020, the SEB waits on a read from the PDG. The PDG powers up in step 3000, obtains its stored IP and seat number in step 3010, and assigns the stored network IP address and other stored IP addresses to its USBs in step 3020. The PDG sets one USB port to a variable of x having a value of 1 in step 3030, and opens the UDB socket in step 3040. At this time, the SEB 106 can read from the PDG as in step 2020. If the processing of the PDG has not times out in step 3050, the PDG will obtain the new IP address from the SEB in step 3060. At this time, the SEB 106 is also performing operations 2030 and 2040 to determine from which USB the call for an IP address was from, and sends the network IP address and associated seat number to the PDG for that USB. The PDG assigns this new IP address in step 3070 and completes the operation in step 3080. It is noted that as shown in steps 3053 and 3055, the value of x can be increased so that the USB sockets for all three USBs can be opened so that the IP addresses for all three USBs can be obtained from the SEB in steps 3040 through 3060.

Figure 15:
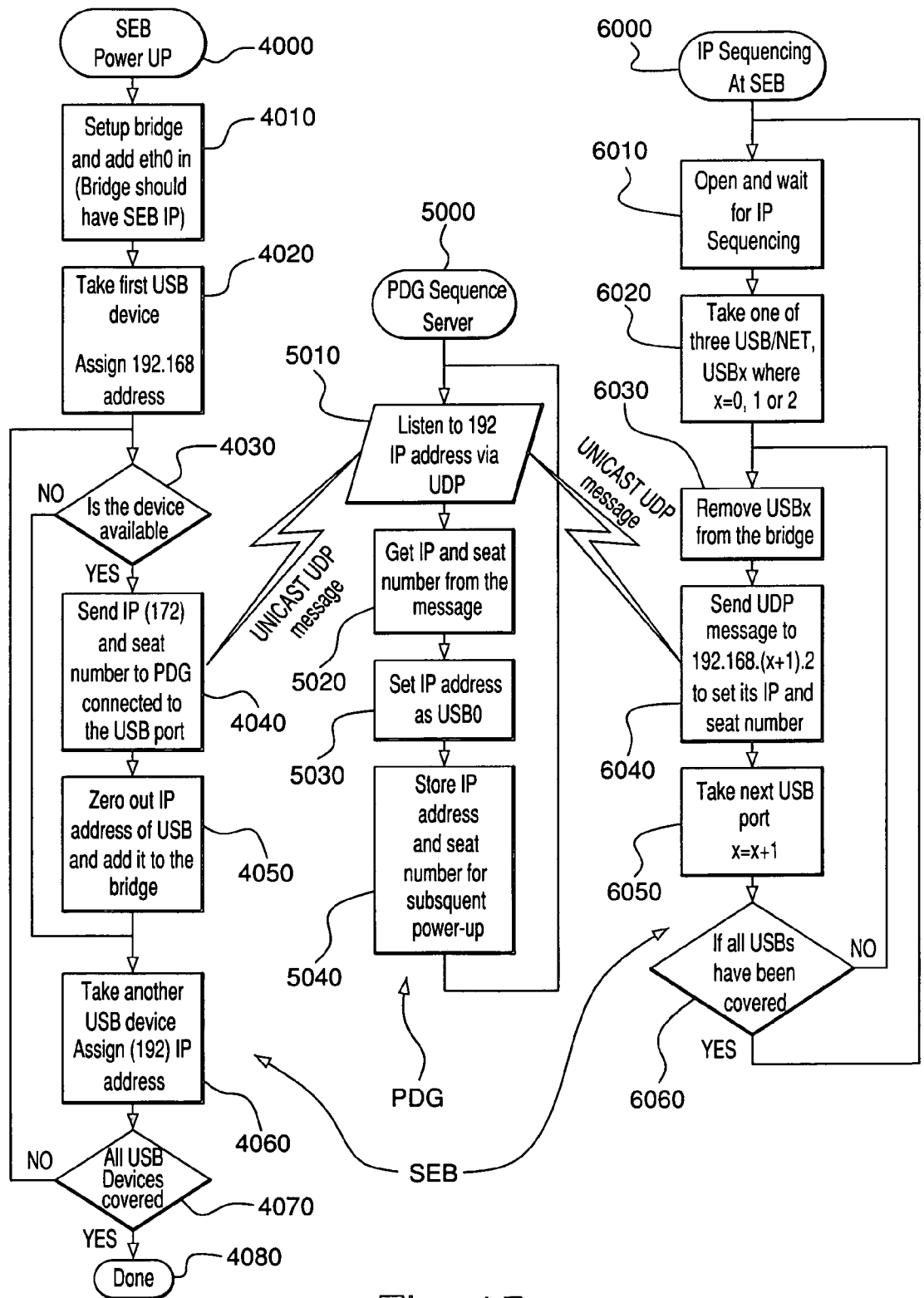
FIG. 15 is a flowchart showing another example of the operations performed by an SEB and a PDG of the system shown in FIGS. 1 and 2 during an IP sequencing operation according to an embodiment of the present invention.

FIG. 15 is another flowchart showing another example of the operations performed by an SEB and a PDG of the system shown in FIGS. 1 and 2 during an IP sequencing operation when an SEB powers up. As indicated, an SEB 106 powers up in step 4000, sets up a bridge in step 4010, and examines the first USB device in step 4020. If the USB is available in step 4030, the SEB sends the IP address info to that SEB in step 4040, and zeroes out the IP address of the USB and adds it to the bridge in step 4050. The SEB 106 selects another USB in step 4060, and if all USBs are not completed, the process returns to step 4030 and repeats for that newly selected USB. Otherwise, the process is completed at step 4080.

While these operations are being performed, the PDG sequence server operates beginning at step 5000 and listens for IP address messages from its SEB 106 in step 5010. When the new IP address is provide, the PDG receives this new address in step 5020 and sets the IP address for the corresponding USB in step 5030. The PDG then stores the IP address for subsequent power up in step 5040.

As further indicated in FIG. 15, when further IP sequencing is to be performed at the SEB beginning at step 6000, the SEB waits for IP sequencing instruction at step 6010. In step 6020, the SEB selects one of the USBs and removes that USB from the bridge in step 6030. In step 6040, the SEB sends the PDG the UDP message to the particular USB to set its IP and seat number, and then selects the next USB port in step 6050. If it is determined in step 6060 that the process has not been completed for all USBs, the process repeats in step 6030 and continues.

FIG. 16 illustrates operations performed by an ADB sequencing manager during an IP sequencing operation as described above with regard to FIGS. 8-10. As indicated, the process starts in step 7000 and a queue is read in step 7010. If the message is determined to be other than an IP sequencing start message in step 7020, the process proceeds to step 7030 and the appropriate message or routine is dispatched to the columns of SEBs 106 being serviced by the ADB 104, and the processing returns to step 7010 to await another read of the queue. If the message is an IP sequencing start message, the processing determines in step 7040 whether the IP sequencing has already been started. If so, the processing returns to step 7010 to await another read of the queue.

If the IP sequencing has not already started, the processing proceeds to step 7050 where the configuration is obtained and the Ethernet ports for that ADB 104 are disconnected. The ADB 104 then selects a column of SEBs 106 in step 7060, selects and IP sequencing start broadcast in step 7070, waits for the timeout period in step 7080, and repeats after determining in step 7090 if there are more columns of SEBs 106 to be sequenced. Once all columns have been sequenced, the Ethernet ports are reopened in step 7100 and the columns are ready for use in step 7110. As stated above, these operations are further shown in the sequence diagrams of FIGS. 8-10.

FIG. 17 is a flowchart showing an example of further operations performed by an ADB and SEB of the system shown in FIGS. 1 and 2 during an IP sequencing operation according to an embodiment of the present invention. As indicated, the column thread is started in step 8000, and it is determined in step 8010 if all columns of SEBs 106 have been completed. If so, the ADB 104 sends a completed message to the ISMS in the head-end equipment 102 in step 8020 and enters and idle state in step 8030.

However, if it is determined in step 8010 that the columns have not been all completed, the processing proceeds to step 8040 where the ADB 102 sends a hello message to an SEB 106 in the column, and the message dispatcher is also notified in step 8050. If the message is determined to be a time out message in step 8060, the processing determines in step 8070 whether all SEBs have been completed. If not, the time out is marked in step 8080 and the processing proceeds to step 8090 where the time out value is reset. The processing then returns to step 8010. However, if all SEBs have been completed, the processing proceeds from step 8070 to step 8100 where the column of SEBs is marked as being completed. The processing then proceeds to step 8090 where the time out value is reset. The processing then returns to step 8010.

If it is determined in step 8060 that the message is a cancel message, a cancel message is sent to the SEB 106 in step 8110. The processing then proceeds to step 8090 where the time out value is reset. The processing then returns to step 8010. If it is determined in step 8060 that the message is an IP complete message, a thank you message is sent to the SEB in step 8120. The processing proceeds to step 8090 where the time out value is reset. The processing then returns to step 8010. If it is determined in step 8060 that the message is an in progress message, the processing proceeds to step 8130 where an in progress message is sent to the ISMS in the head-end equipment in step 8130, the timeout value is reset in step 8140 and the processing returns to step 8040 instead of 8010. However, if none of these messages are identified in step 8060, the processing proceeds to step 8090 where the time out value is reset. The processing then returns to step 8010.

Figure 18:
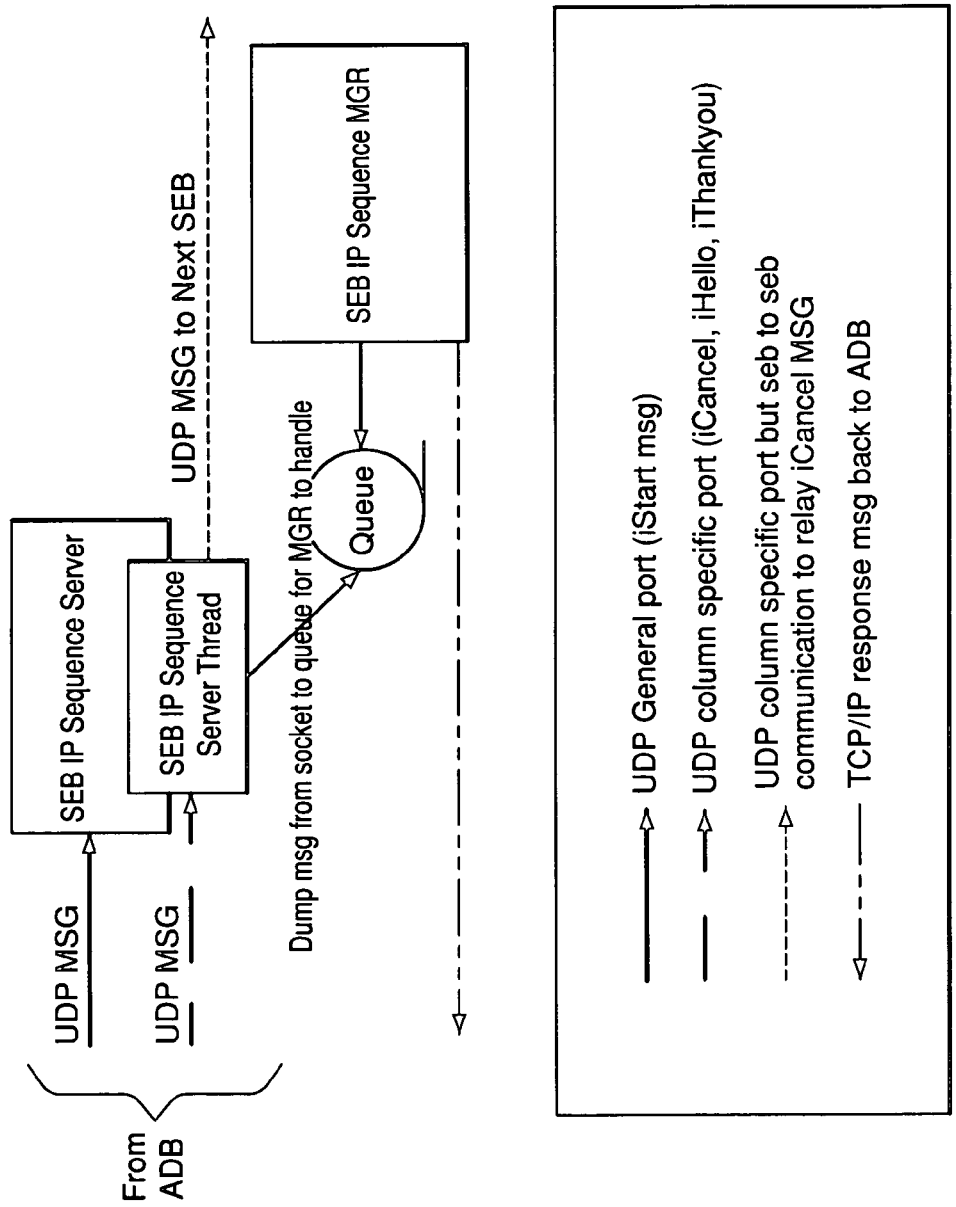
FIG. 18 is a conceptual diagram showing an example of a flow of messages from an SEB of the system shown in FIGS. 1 and 2 during an IP sequencing operation according to an embodiment of the present invention.
Figure 19:
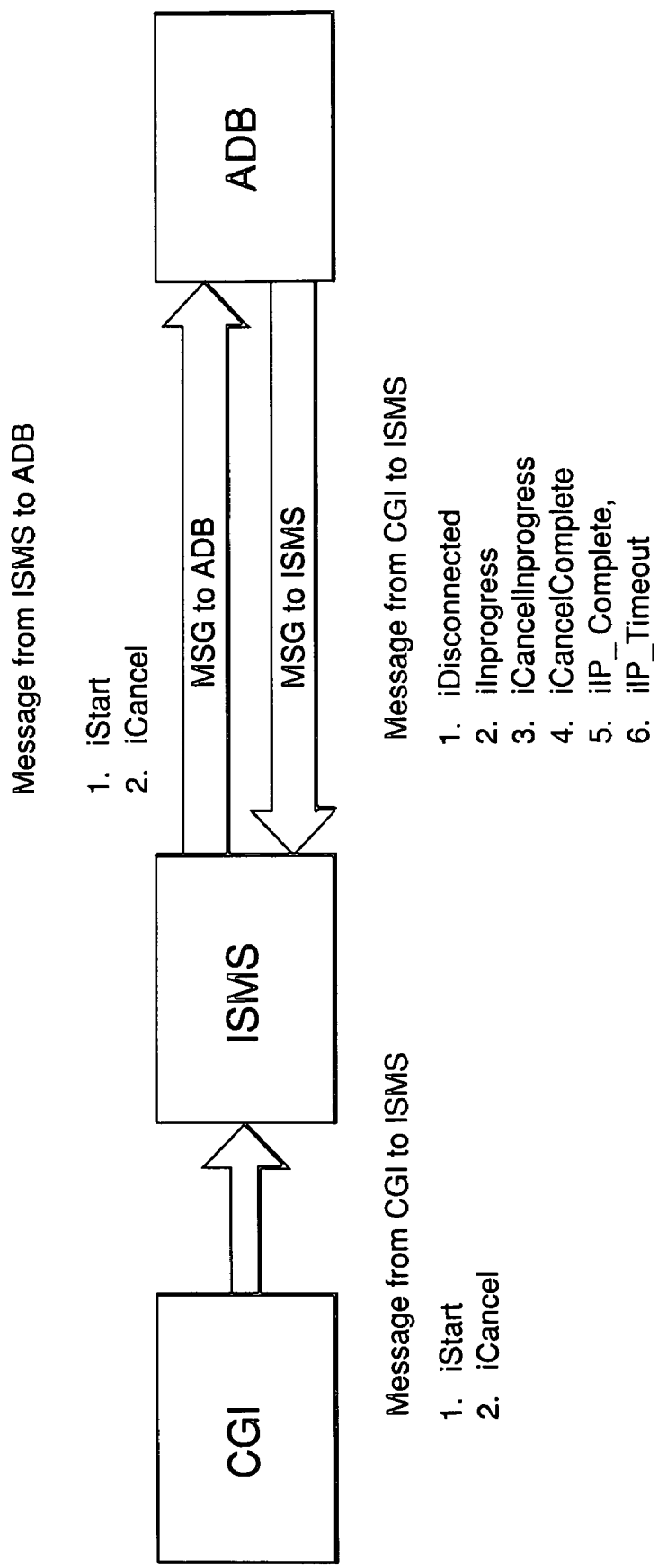
FIG. 19 is a conceptual diagram illustrating an exchange of messages between a CGI, IP sequencing master server and ADB during an IP sequencing operation according to an embodiment of the present invention.
Figure 20:
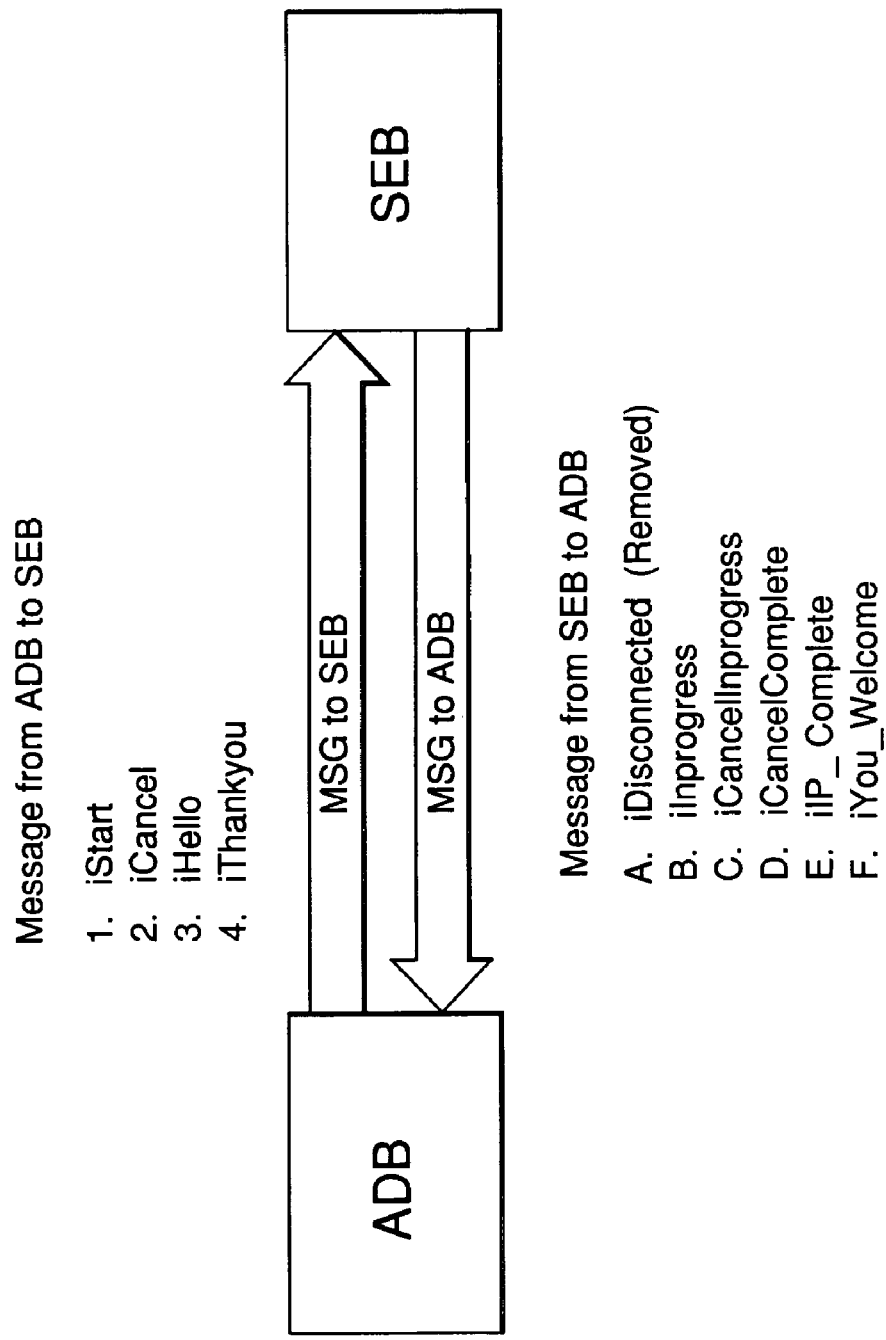
FIG. 20 is a conceptual diagram illustrating an exchange of messages between an ADB and SEB during an IP sequencing operation according to an embodiment of the present invention.
Figure 21:
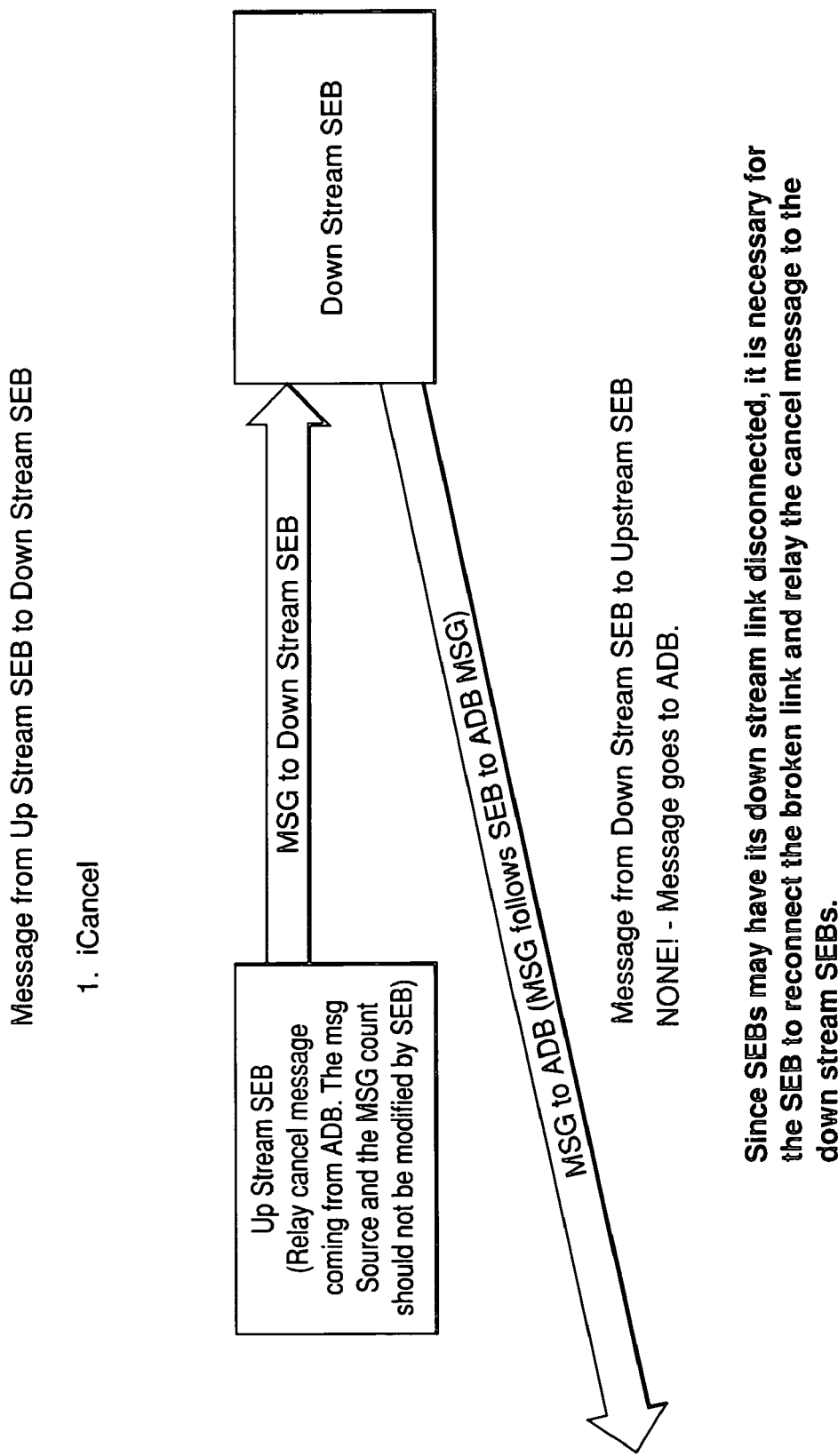
FIG. 21 is a conceptual diagram illustrating an exchange of messages between two SEBs during an IP sequencing operation according to an embodiment of the present invention.

It is noted that FIG. 18 is a conceptual diagram showing an example of a flow of messages from an SEB of the system shown in FIGS. 1 and 2 during an IP sequencing operation, and FIG. 19 is a conceptual diagram illustrating an exchange of messages between a CGI, IP sequencing master server and ADB during an IP sequencing operation. Furthermore, FIG. 20 is a conceptual diagram illustrating an exchange of messages between an ADB and SEB during an IP sequencing operation described above, and FIG. 21 is a conceptual diagram illustrating an exchange of messages between two SEBs during an IP sequencing operation when the IP sequencing is canceled.

Figure 22:
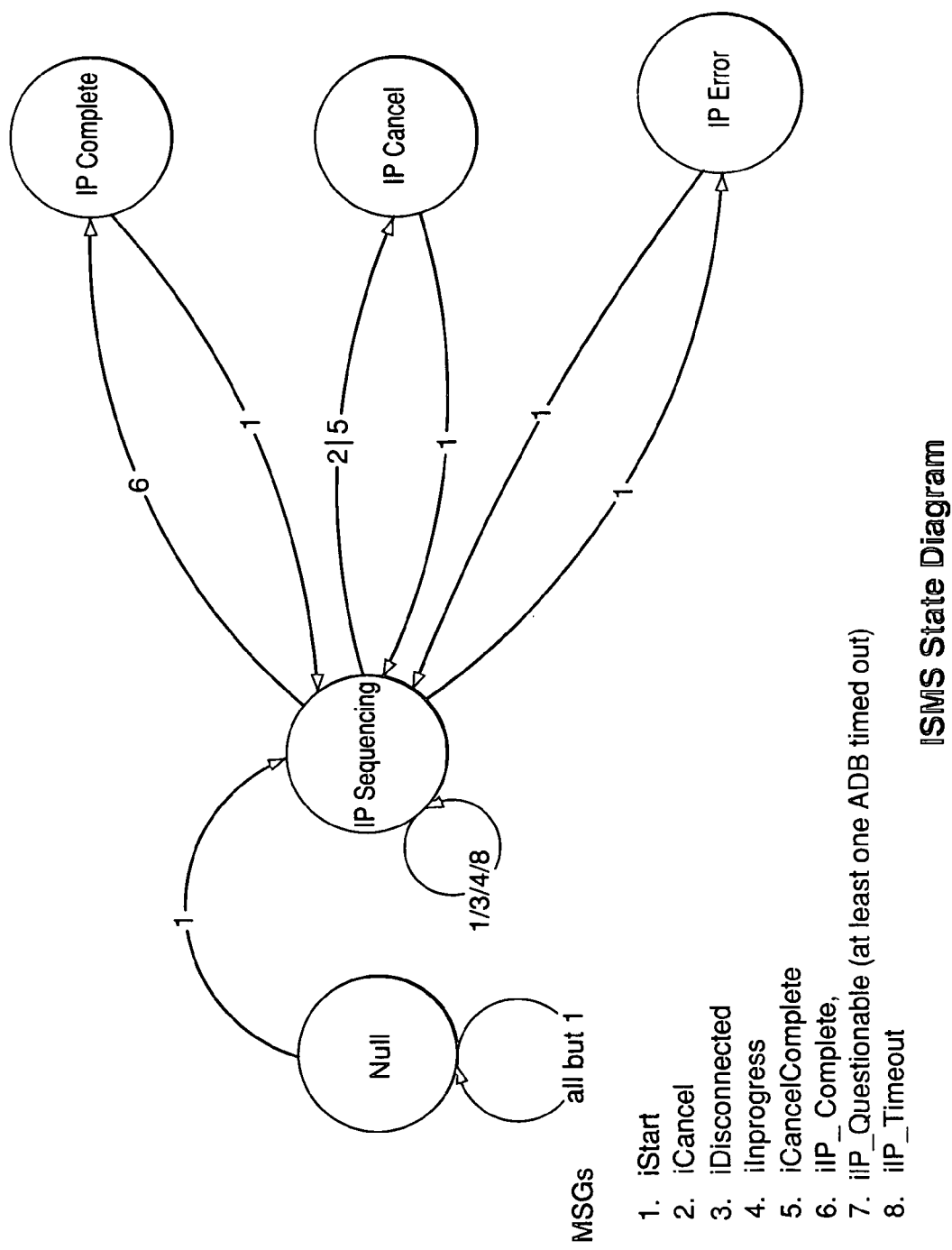
FIG. 22 is a state diagram illustrating an example of the various states of the IP sequencing master server during the IP sequencing operation according to an embodiment of the present invention.
Figure 23:
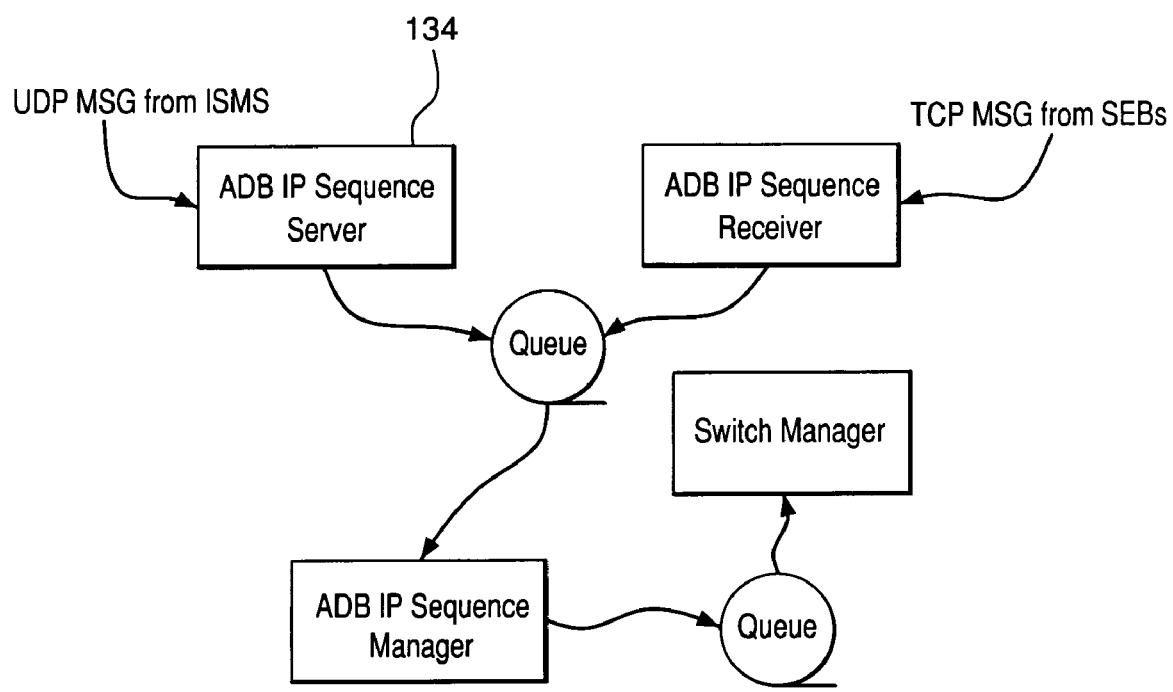
FIG. 23 is an example of a flow of messages between modules of an ADB of the system shown in FIGS. 1 and 2 during the IP sequencing operation according to an embodiment of the present invention.
Figure 24:
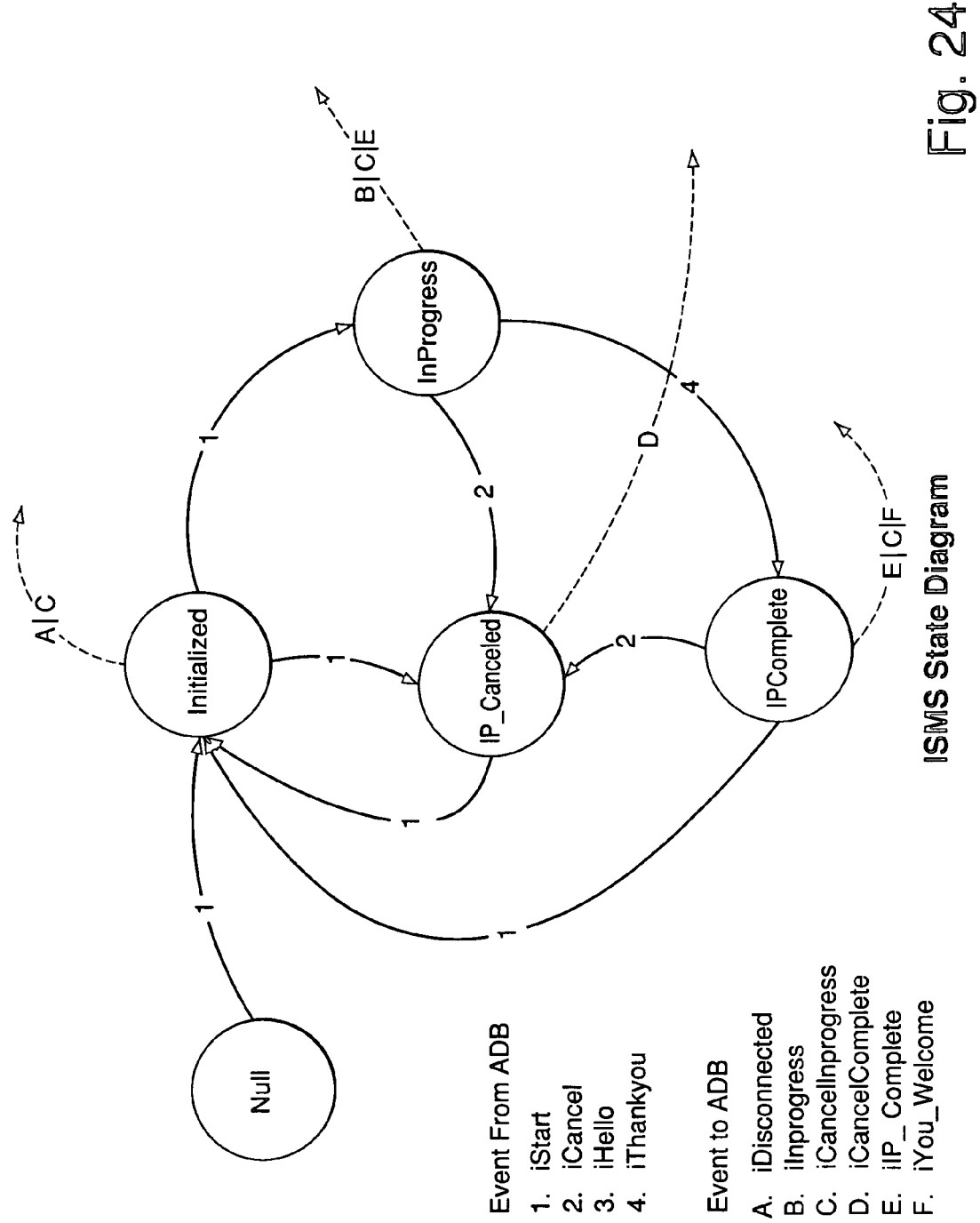
FIG. 24 is a state diagram illustrating an example of the various states of an SEB of the system shown in FIGS. 1 and 2 during the IP sequencing operation according to an embodiment of the present invention.
Figure 25:
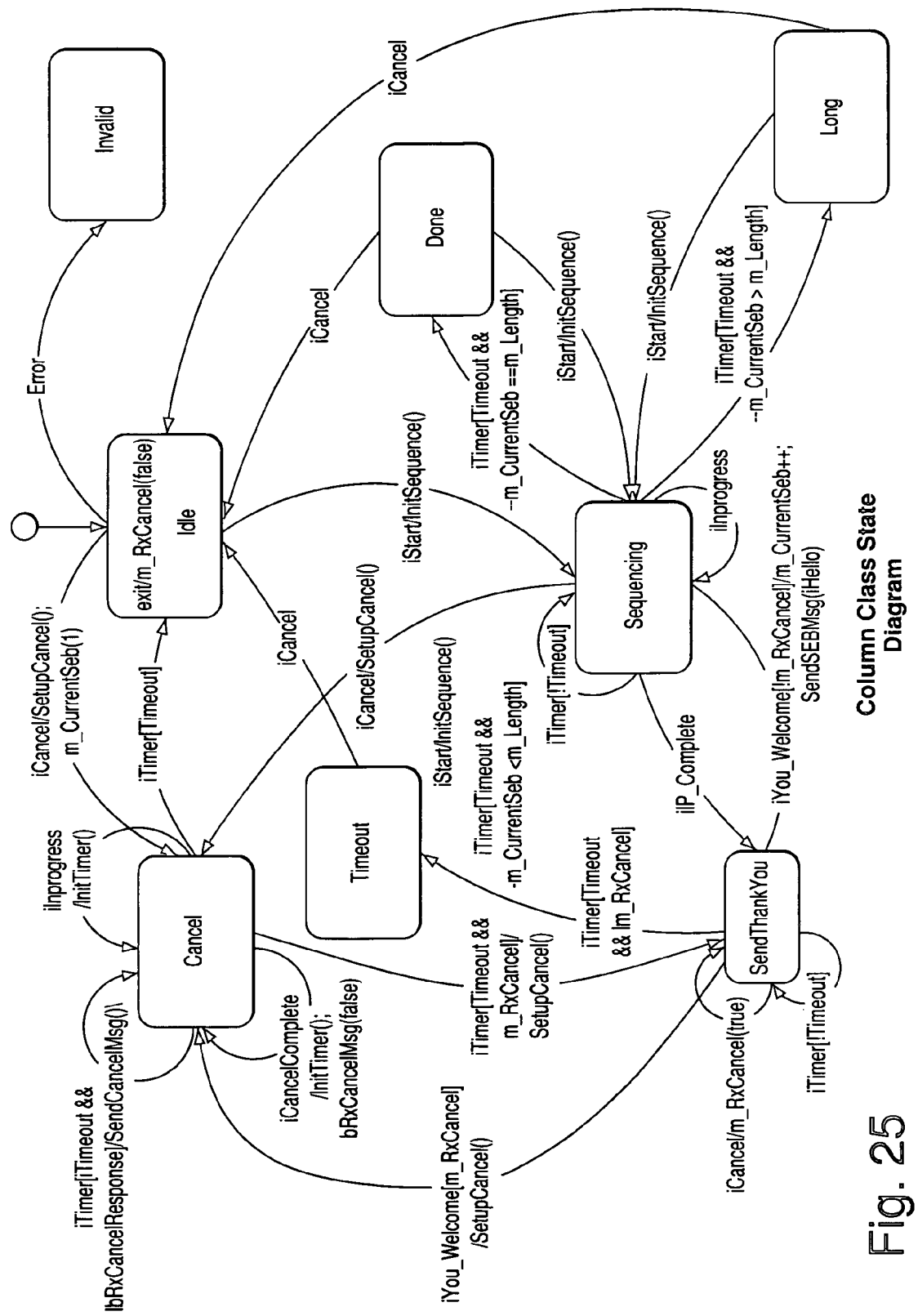
FIG. 25 is a state diagram illustrating an example of the various states of a column of SEBs of the system shown in FIGS. 1 and 2 during the IP sequencing operation according to an embodiment of the present invention.

FIG. 22 is a state diagram illustrating an example of the various states of the IP sequencing master server during the IP sequencing operation according to an embodiment of the present invention, and FIG. 23 is an example of a flow of messages between modules of an ADB of the system shown in FIGS. 1 and 2 during the IP sequencing operation according to an embodiment of the present invention. As indicated, messages from the IP sequence server 134 and IP sequence receiver 138 of the ADB 104 (see FIG. 4) are received in a queue that is then read by the IP sequence manager 132 of the ADB 104. The IP sequence manager 132 sends messages to the switch manager 136 via a queue. FIG. 24 is a state diagram illustrating an example of the various states of an SEB of the system shown in FIGS. 1 and 2 during the IP sequencing operation as discussed above, and FIG. 25 is a state diagram illustrating an example of the various states of a column of SEBs of the system shown in FIGS. 1 and 2 during the IP sequencing.

Figure 26:
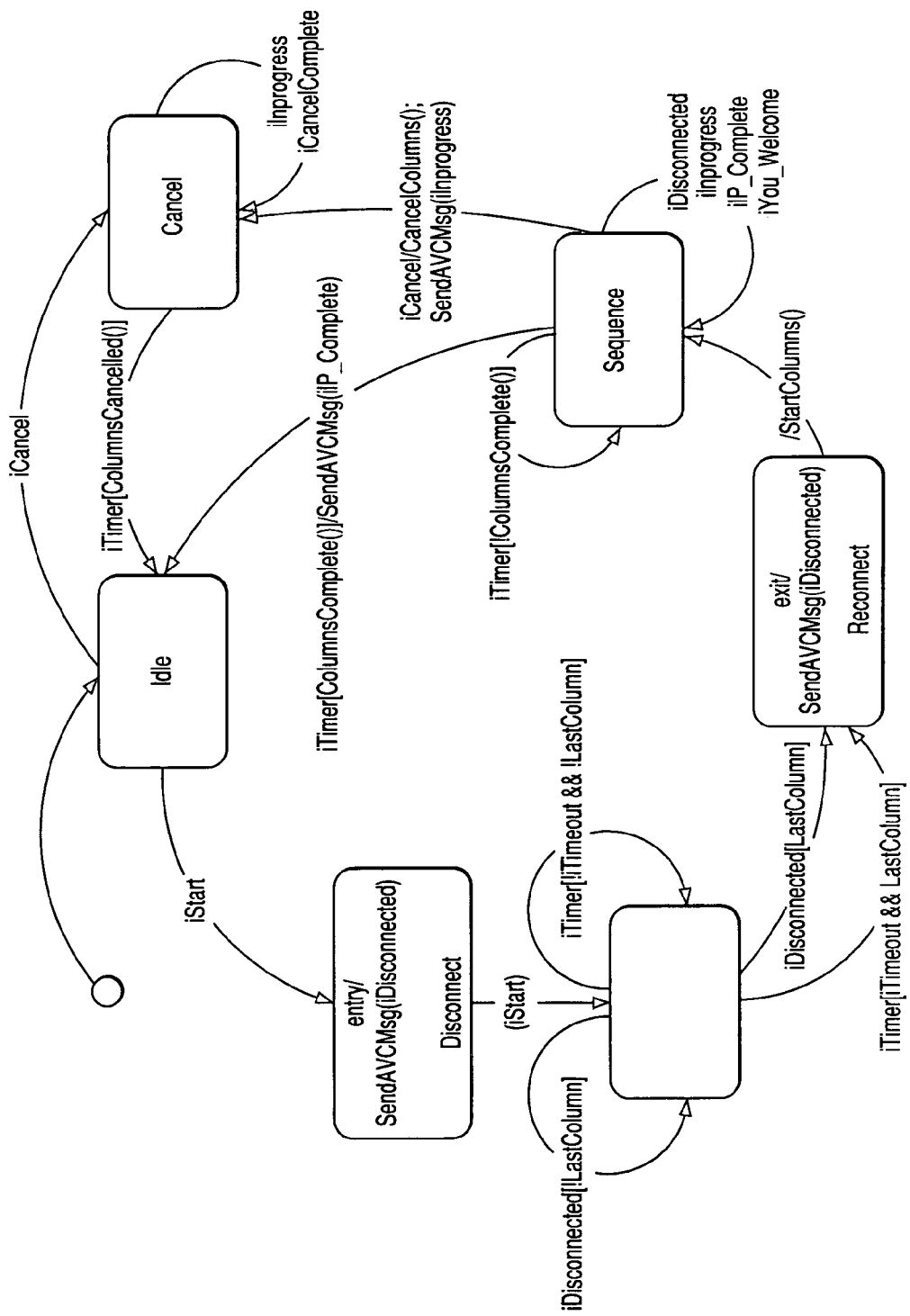
FIG. 26 is a state diagram illustrating an example of the various states of the ADB sequence manager during the IP sequencing operation according to an embodiment of the present invention.
Figure 27:
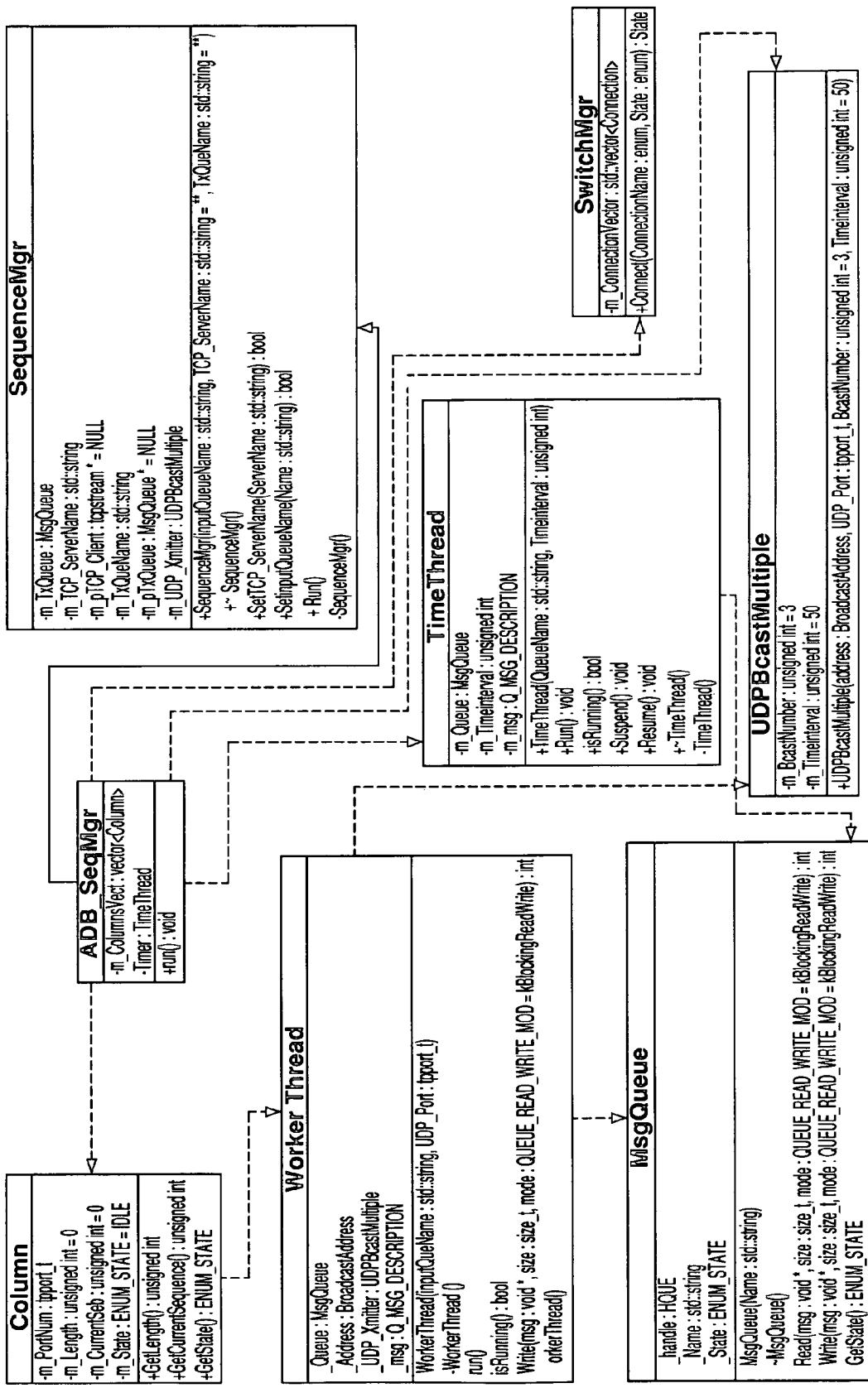
FIG. 27 is a conceptual diagram illustrating an example of message exchanges between the various manager modules of the components of the system shown in FIGS. 1 and 2 according to an embodiment of the present invention.
Figure 28:
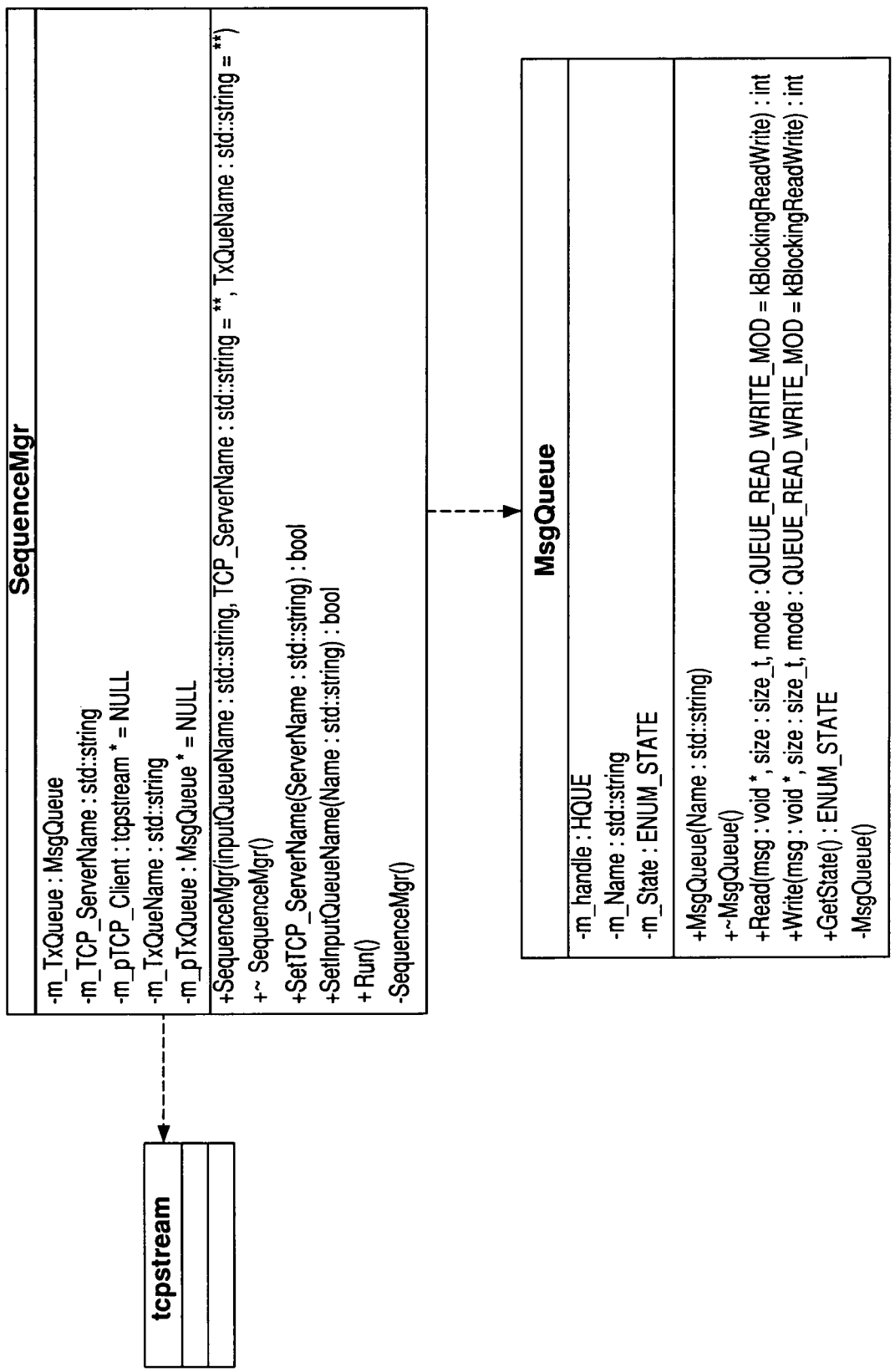
FIG. 28 is a conceptual diagram illustrating an example of message exchanges between the IP sequence manager and message queue of the system as shown in FIGS. 1 and 2 according to an embodiment of the present invention.

Furthermore, FIG. 26 is a state diagram illustrating an example of the various states of the ADB sequence manager during the IP sequencing operation as can be appreciated from the operation of the ADB 104 as discussed above. FIG. 27 is a conceptual diagram illustrating an example of message exchanges between the various manager modules of the components of the system shown in FIGS. 1 and 2, and FIG. 28 is a conceptual diagram illustrating an example of message exchanges between the IP sequence manager and message queue of the system as shown in FIGS. 1 and 2.

FIG. 29 is a flow diagram illustrating an example of operations of an SEB and its SVDUs of the system shown in FIGS. 1 and 2 during its IP sequencing of its SVDUs during power up of the SEB as discussed above. FIG. 30 is a flow diagram illustrating an example of operations of an SEB and its SDVUs of the system shown in FIGS. 1 and 2 during its IP sequencing of its SVDUs when the SVDUs request IP addresses, and FIG. 31 is a flow diagram illustrating an example of operations of a SEB and its SVDUs of the system shown in FIGS. 1 and 2 during its IP sequencing of its SVDUs when the SVDUs request IP addresses at power up. These operations are described in the IP sequencing process described above.

It is noted that once the above IP sequencing process has been completed, the PFIS 100 is ready for use. The PFIS 100 can be used, for example, to provide services to the passengers, such as audio and video services, and various control features.

The PFIS 100 includes an Auto Play Scripting feature which manages the entertainment system features of the PFIS 100 during a flight. The scripting will control VTR and digital servers during the flight. The scripting will provide a screen for the flight crew to select a theme for a flight and enable the crew to control the entertainment via, for example, the CMT 100 (See FIGS. 1-5) based on pre-selected titles.

Prior to the flight commencing, the airline can create a theme, which can be based on children, adults or any special occasions such as seasonal holiday themes and so on. Each of these themes include video and audio programs suitable for the theme. The programs are loaded onto the plane, such as into a memory or in a tape deck at the head-end equipment 102, prior to running the script. As the flight crew enters the plane, the PFIS 100 is powered on. Once the system becomes fully operational, the crew can select an auto-scripting them and getting the theme by pressing a start button on, for example, the CMT 110. The PFIS 100 then runs the theme during the flight.

While there is a script running, a script conductor reads the script file and commands primitive functions in each LRUs, such as the SEBs 106, to perform primitive functions such as play a digital video and so on. The auto-script server can service on the AVC 110 or a DSU 114 (see FIG. 2) to provide web pages on a display for interface by a user, such as a crew member. The AVC 110 and DSU 114 have their local server manage their low-level task of controlling their resources, while primitives control the tape player and digital decoders.

As can be appreciated by one skilled in the art, primitives are lower level functions that operate on resources or devices. The primitive are used, for example, to play tape players, digital servers, tuners, TUs and other devices. In order to incorporate primitives into an auto-play script, a primitive manager is used to manage the primitives. The primitive manager operates as a UDP server to accept commands from another program or CGI. The UDP protocol gives the manager flexibility to accept command by a broadcast message.

Figure 32:
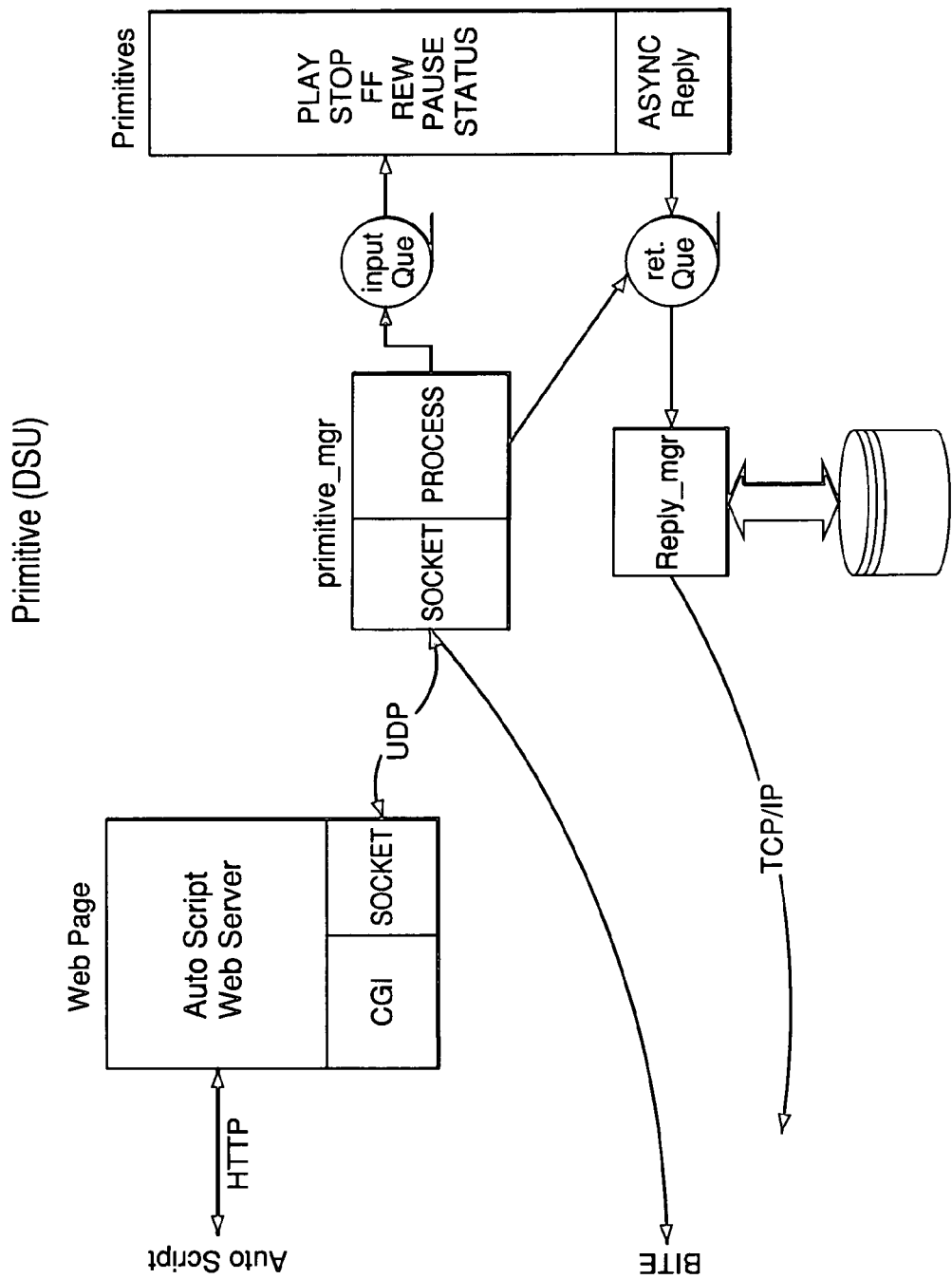
FIG. 32 is a conceptual diagram illustrating an example of a relationship between primitive DSUs for auto play scripting operations performed by the system shown in FIGS. 1 and 2 according to an embodiment of the present invention.

FIG. 32 is a conceptual diagram illustrating an example of a relationship between primitive DSUs for auto play scripting operations performed by the system shown in FIGS. 1 and 2 according to an embodiment of the present invention. As part of their operations, the primitives include a primitive reply manager which will accept ASYNC messages from the primitives. The reply manager will log and send back the reply to the calling routing. The primitive managers operations include waiting on a UDP socket; determining the command and service needed when a message is received; sending a command to the reply manager via a queue for logging purposes; sending a command to the primitive function via a queue; and reading a UDP. The reply manager waits on the queue messages from the primitive manger and the primitives. When a message arrives, the reply manager adds it to the list to be logged. When the message arrived from primitives, the reply manager matches the reply from the primitives to the list of messages to be logged, removes matching logged messages from the list; and sends a message back to the calling routing.

Figure 33:
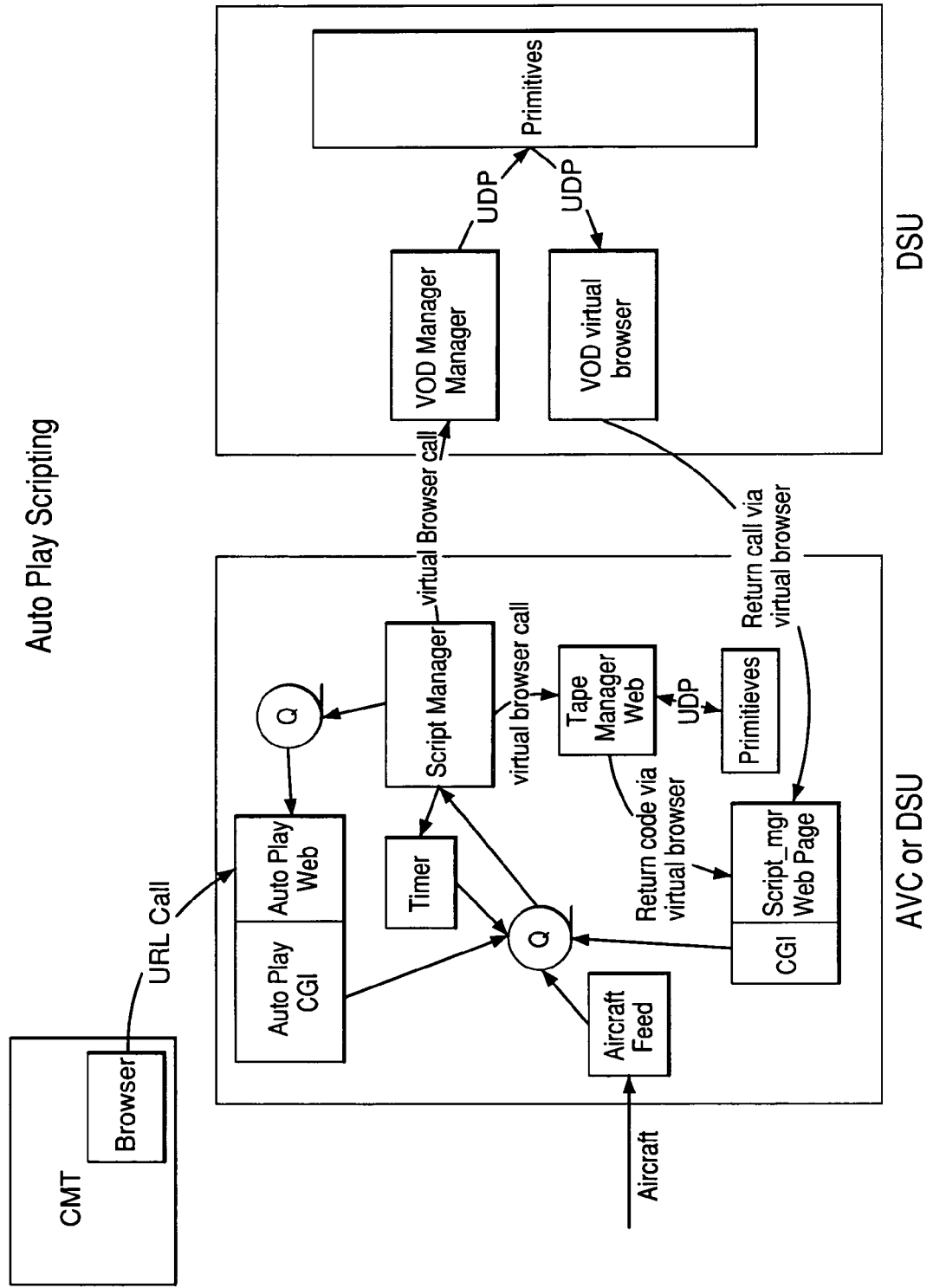
FIG. 33 a conceptual diagram illustrating an example of message exchanges and operations performed by the CMT, AVC and DSU for auto play scripting operations performed by the system shown in FIGS. 1 and 2 according to an embodiment of the present invention.
Figure 34:
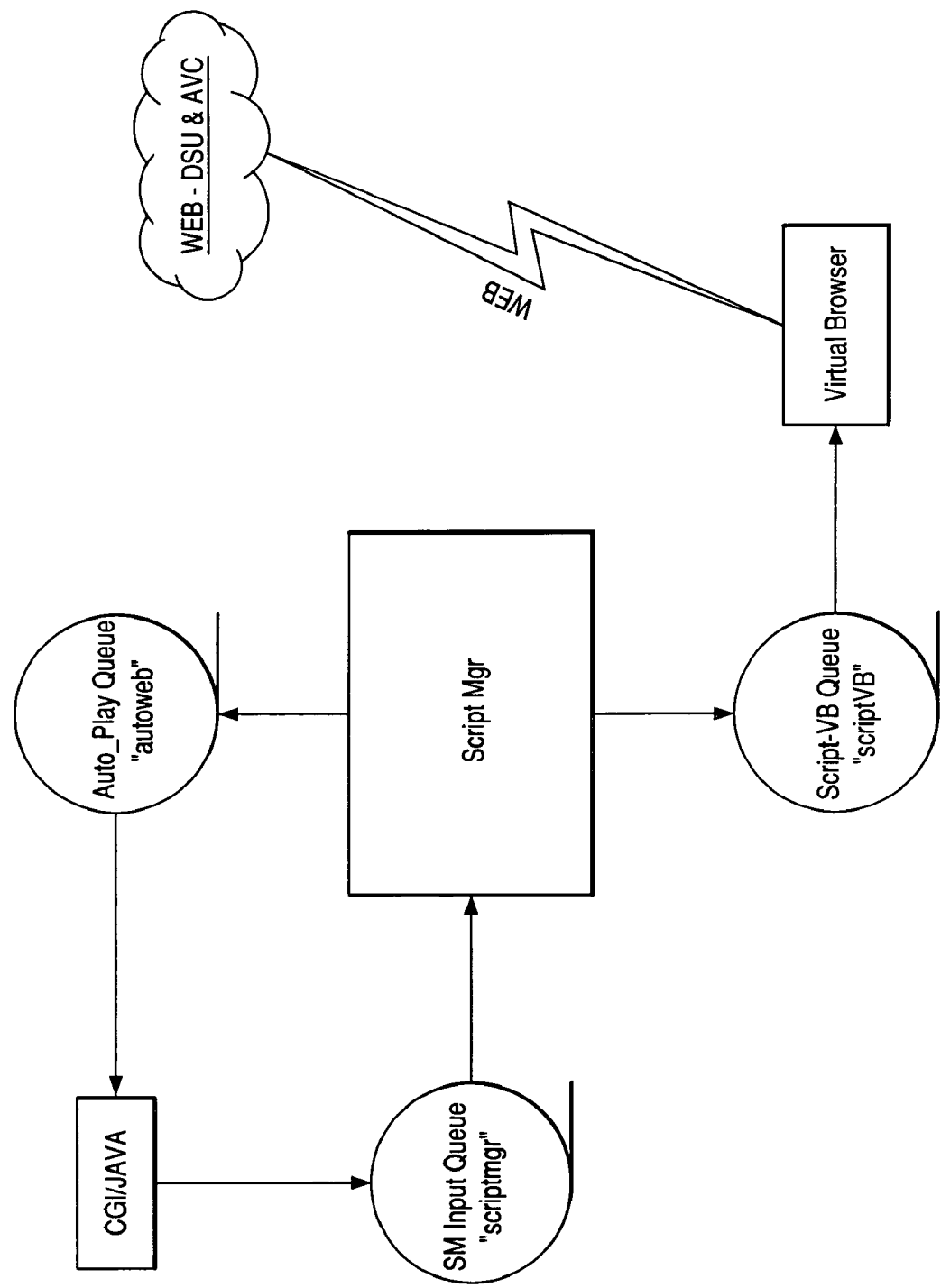
FIG. 34 is an example of a relationship and message exchange between components and modules of the system shown in FIGS. 1 and 2 during an auto scripting operation according to an embodiment of the present invention.

FIG. 33 a conceptual diagram illustrating an example of message exchanges and operations performed by the CMT, AVC and DSU for auto play scripting operations performed by the system shown in FIGS. 1 and 2 according to an embodiment of the present invention. FIG. 34 is an example of a relationship and message exchange between components and modules of the system shown in FIGS. 1 and 2 during an auto scripting operation.

The process of performing the auto-script functions are as follows. A flight crew member opens the Auto-Scripting web page, which contains a list of themes from which to select. The flight crew member presses a start button, such as a virtual start button displayed on the web page, to initiate the auto scripting. The web page sends a message with script name to a script manager to initiate the scripting.

The script manager starts by reading in the script, obtaining the current aircraft state and status, such as measuring the weight on the wheels to determine whether the aircraft is in flight. Depending on the status, the scrip manager finds the initial step in the script. The script manager performs the first statement by sending service request to the target server via a virtual web browser. The script manager checks to see if there are any other steps to follow. If the above request was the last one, it will end the script. However, if threw are more requests, the scrip manager waits on the queue for the following events:

If the resource replying replies back with an error message, the script manager can perform a retry, a skip step or a substitute step. When the end of the program arrives, the script manager checks for additional wait times followed by the next statement as discussed above (see the first statement above). The script manager can perform a timeout and go to the next statement. Also, the script manager can receive an aircraft signal, such as a flight phase (weight off/on wheels, taxiing, cruising, etc.). When the last statement is finished, the script is terminated.

Figure 35:
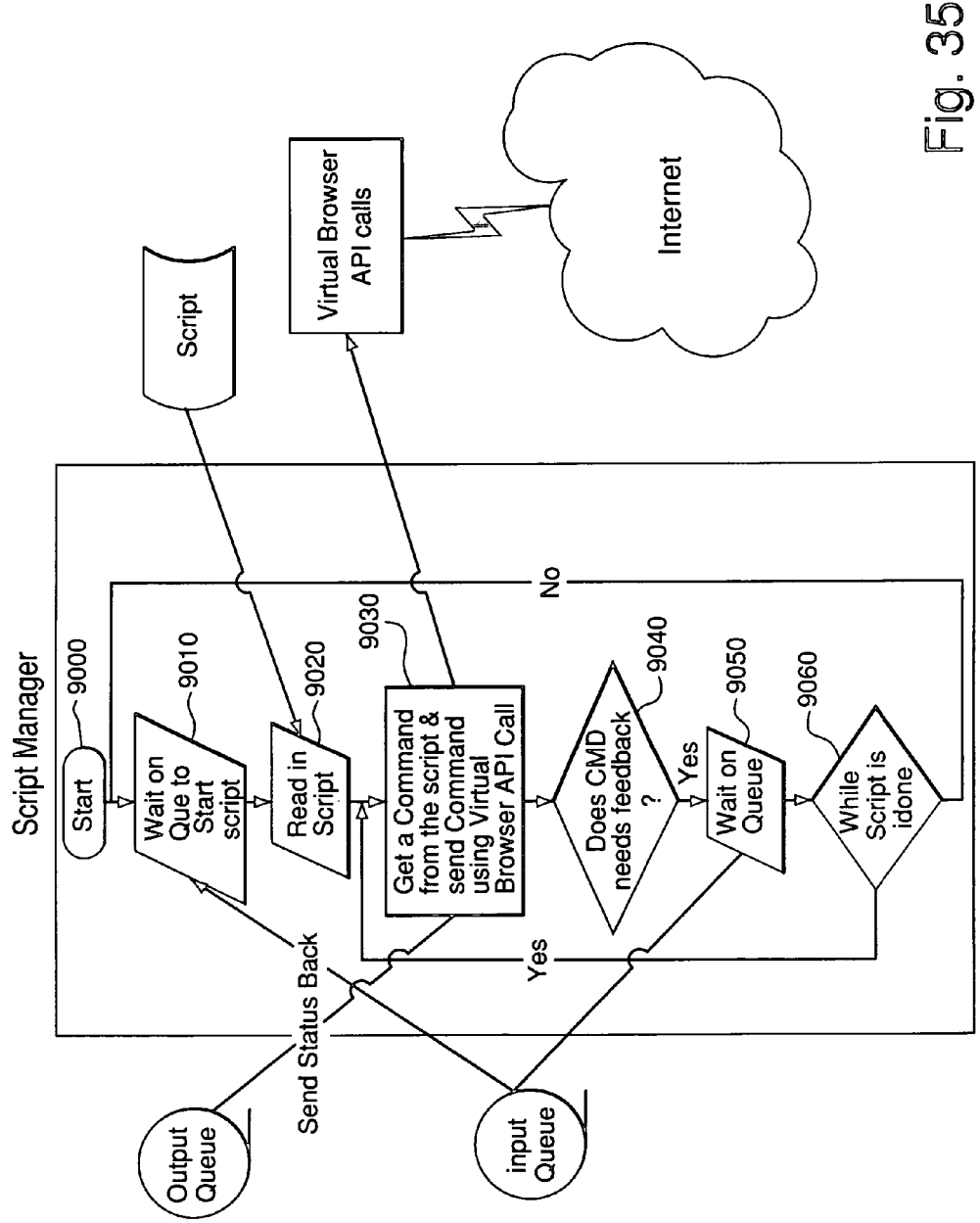
FIG. 35 is a flowchart illustrating an example of operations performed by a script manager of the system shown in FIGS. 1 and 2 during an auto scripting operation according to an embodiment of the present invention.

FIG. 35 is a flowchart illustrating an example of operations performed by a script manager of the system shown in FIGS. 1 and 2 during an auto scripting operation as described above. As indicated in FIG. 35, when the scripting operation starts in step 9000, the script manager awaits input to a queue in step 9010. When the input to the queue is received, the script manager reads in the script at step 9020. In step 9030, the script manager gets a command from the script and sends the commend using a virtual browser API call. If the command needs feedback in step 9040, the script manager waits to receive further information from the queue in step 9050. If the script is still being done in step 9060, the processing returns to step 9030 to get another command from the script, and the process is repeated as discussed above. However if the script is no longer being done, the processing returns to step 9010 to wait on the queue to start the script again.

Figure 36:
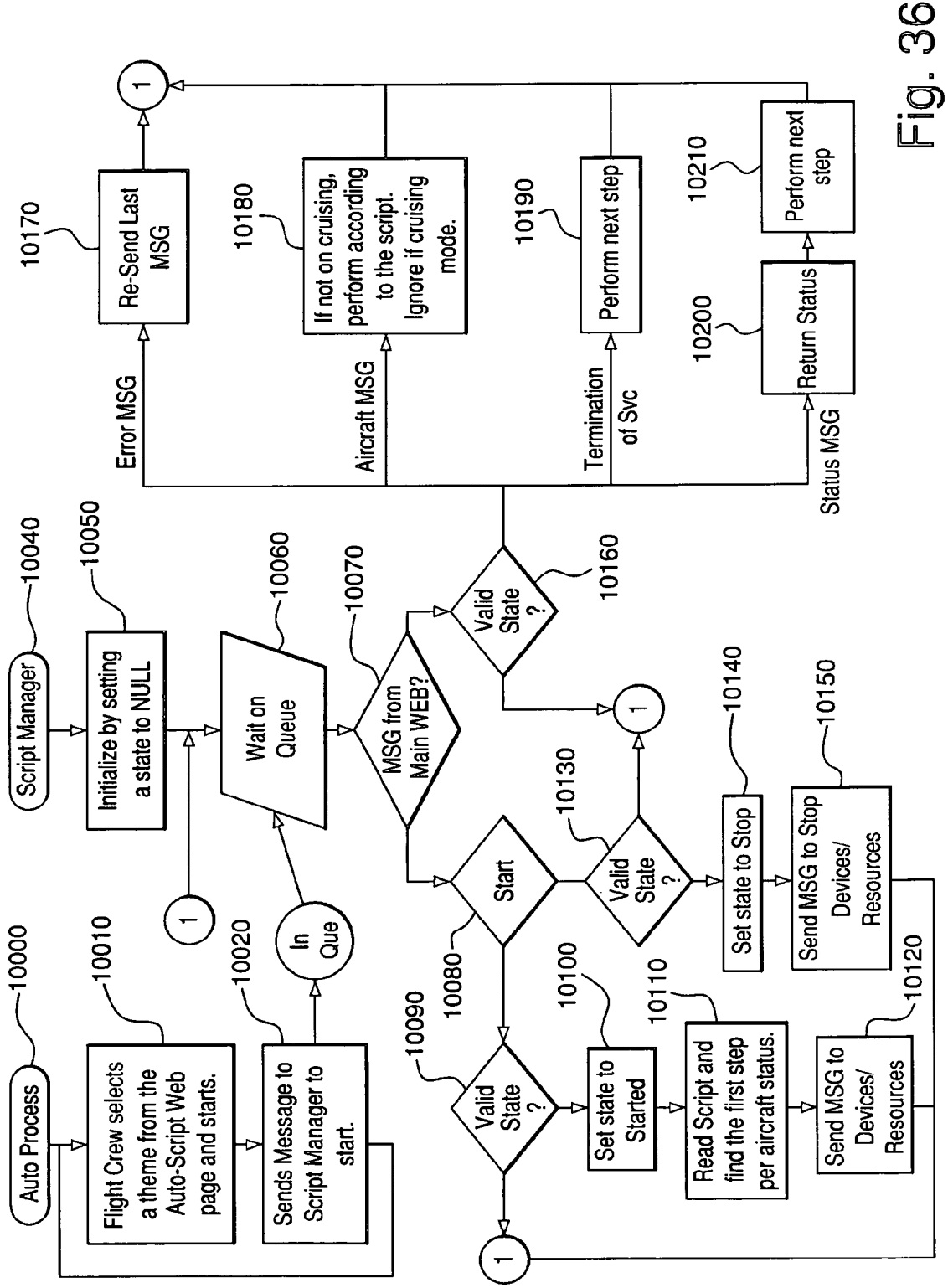
FIG. 36 is a flowchart illustrating an example of operations performed by a script manager of the system shown in FIGS. 1 and 2 during an auto scripting operation according to an embodiment of the present invention

FIG. 36 is another flowchart illustrating an example of operations performed by a script manager of the system shown in FIGS. 1 and 2 during an auto scripting operation. As indicted, the auto process is started in step 10000, the flight crew selects a theme in step 10010, and a message is sent to the script manager via a queue. The script manager process runs beginning at step 10040 in this example, and it initialized by setting a state to null in step 10050. Upon waiting on the queue in step 10060 and receiving a message, the processing proceeds to step 10070.

If it is determined in step 10070 that the message is from the main Web, the processing proceeds to step 10080 to determine whether to start. If the process it to begin, it is determined in step 10090 whether the state is valid. If not, then the processing returns to step 10060.

However, if the state is valid, the state is set to started in step 10100, the script is read and the first step is found in step 10110, and a message is sent to deliver resources in step 10120. The processing then returns to step 10060.

If the process is not to start in step 10080, it is determined in step 10130 whether the state is valid. If not, the processing returns to step 10060. If it is valid, the state is set to stop in step 10140, and a stop message is sent in step 10150. The processing then returns to step 10060. Also, if in step 10130 it is determined that the state is not valid, the processing returns to step 10060.

Referring back to step 10070, if the message is not from the main Web, it is determined in step 10160 whether the state is valid. If not, the processing returns to step 10060. However, if the state is valid, the message is acted upon.

That is, if the message is an error message, the last message is resent in step 10170 and the processing returns to step 10060. If the message is an aircraft message and the aircraft is not cruising on the runway, the script is performed in step 10180 and the processing returns to step 10060. If the message is a termination message, the next step in the script is performed in step 10190 and the processing returns to step 10060. If the message is a status message, the status is provided in step 10200, the next step in the script is performed in step 10210, and the processing returns to step 10060.

Accordingly, the above scripting processes enable the PFIS 100 to be used for in-flight entertainment purposes.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A passenger flight information system, comprising:
   head-end equipment;
   at least one area distribution box having a plurality of switch ports; and
   a plurality of seat electronics boxes, arranged in groups such that each of a plurality of said groups is coupled to a respective switch port of a respective area distribution box and serviced by that respective area distribution box;
   the head-end equipment, area distribution box and seat electronics boxes being adapted to operate to perform an addressing process to assign respective Internet Protocol (IP) addresses to respective components associated with the head-end equipment, area distribution box and seat electronics boxes by which the respective components are identified in the passenger flight information system, at least one of the components associated with a seat electronics box being a smart video display unit that includes a processor which enables the smart video display unit to perform its own tasks and decision making; and
   during the addressing process, the area distribution box disconnects all of its said switch ports to isolate itself, and then sequentially opens one of said switch ports at a time to send sequencing start messages to the group of seat electronics boxes coupled to the switch port that is opened.

2. A passenger flight information system as claimed in claim 1, further comprising:
   a plurality of the area distribution boxes, each servicing a plurality of groups of seat electronics boxes.

3. A passenger flight information system as claimed in claim 1, wherein:

the head-end equipment is adapted to initiate an IP addressing process by sending messages to the at least one area distribution box to control the at least one area distribution box to make address inquiries of the at least one group of seat electronics boxes that area distribution box is servicing, such that that area distribution box operates in cooperation with the head-end equipment to assign the respective IP addresses to the respective seat electronics boxes in the at least one group.

4. A passenger flight information system as claimed in claim 3, further comprising:

a plurality of the area distribution boxes, each servicing a plurality of groups of seat electronics boxes; and wherein the IP addressing process is performed for all of the area distribution boxes and groups of seat electronics boxes.

5. A passenger flight information system as claimed in claim 3, wherein:

the area distribution box makes the address inquiries of the seat electronics boxes in the group in a sequential manner.

6. A passenger flight information system as claimed in claim 1, wherein:

the head-end equipment, area distribution box and seat electronics box each include modules which are adapted to cooperatively operate to perform the addressing process.

7. A passenger flight information system as claimed in claim 1, wherein:

the components include universal serial bus (USB) ports and video display units.

8. A passenger flight information system as claimed in claim 1, wherein:

the head-end equipment is further adapted to perform a scripting operation to provide selected information to the components being serviced by the seat electronics boxes whose IP addresses have been assigned during the addressing process.

9. A passenger flight information system as claimed in claim 8, wherein:

the information is multimedia data provided according to a script selected via a control device associated with the head-end equipment.

10. A passenger flight information system as claimed in claim 1, wherein:

each of the respective IP addresses assigned to the components is associated with respective media access control (MAC) addresses assigned to the components.

11. A method of establishing a passenger flight information system, the method comprising:

providing head-end equipment, at least one area distribution box having a plurality of switch ports, and a plurality of seat electronics boxes, arranged in groups such that each of a plurality of said groups is coupled to a respective switch port of a respective area distribution box and serviced by that respective area distribution box;

operating the head-end equipment, area distribution box and seat electronics boxes to perform an addressing process to assign respective Internet Protocol (IP) addresses to respective components associated with the head-end equipment, area distribution box and seat electronics boxes by which the respective components are identified in the passenger flight information system, at least one of the components associated with a seat electronics box being a smart video display unit that includes a processor which enables the smart video display unit to perform its own tasks and decision making; and during the addressing process, operating the area distribution box to disconnect all of its said switch ports to isolate itself, and then sequentially open one of said switch ports at a time to send sequencing start messages to the group of seat electronics boxes coupled to the switch port that is opened.

12. A method as claimed in claim 11, wherein:

the providing step provides a plurality of the area distribution boxes, each servicing a plurality of groups of seat electronics boxes.

13. A method as claimed in claim 11, wherein:

during the operating step, the head-end equipment initiates an IP addressing process by sending messages to the at least one area distribution box to control the at least one area distribution box to make address inquiries of the at least one group of seat electronics boxes that area distribution box is servicing, such that that area distribution box operates in cooperation with the head-end equipment to assign the respective IP addresses to the respective seat electronics boxes in the at least one group.

14. A method as claimed in claim 13, wherein:

the providing step provides a plurality of the area distribution boxes, each servicing a plurality of groups of seat electronics boxes; and wherein the IP addressing process is performed for all of the area distribution boxes and groups of seat electronics boxes.

15. A method as claimed in claim 13, wherein:

the area distribution box makes the address inquiries of the seat electronics boxes in the group in a sequential manner.

16. A method as claimed in claim 11, wherein:

the head-end equipment, area distribution box and seat electronics box each include modules which are adapted to cooperatively operate to perform the addressing process.

17. A method as claimed in claim 11, wherein:

the components include universal serial bus (USB) ports and video display units.

18. A method as claimed in claim 11, further comprising:

operating the head-end equipment to perform a scripting operation to provide selected information to the components being serviced by the seat electronics boxes whose IP addresses have been assigned during the addressing process.

19. A method as claimed in claim 18, wherein:

the information is multimedia data provided according to a script selected via a control device associated with the head-end equipment.

20. A method as claimed in claim 11, wherein:

each of the respective IP addresses assigned to the components is associated with respective media access control (MAC) addresses assigned to the components.

* * * * *